US011435980B2

(12) United States Patent
Byun et al.

(10) Patent No.: US 11,435,980 B2
(45) Date of Patent: Sep. 6, 2022

(54) SYSTEM FOR PROCESSING USER UTTERANCE AND CONTROLLING METHOD THEREOF

(71) Applicant: Samsung Electronics Co., Ltd., Gyeonggi-do (KR)

(72) Inventors: Dooho Byun, Gyeonggi-do (KR); Woonsoo Kim, Gyeonggi-do (KR); Taekwang Um, Gyeonggi-do (KR); Dasom Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/280,754

(22) Filed: Feb. 20, 2019

(65) Prior Publication Data
US 2019/0258456 A1    Aug. 22, 2019

(30) Foreign Application Priority Data

Feb. 20, 2018  (KR) ................. 10-2018-0019610

(51) Int. Cl.
*G06F 3/16* (2006.01)
*G06F 3/0482* (2013.01)
(Continued)

(52) U.S. Cl.
CPC ............ *G06F 3/167* (2013.01); *G06F 3/0482* (2013.01); *G06F 3/0484* (2013.01); *G06F 40/35* (2020.01);
(Continued)

(58) Field of Classification Search
CPC .......... G06F 3/167; G06F 40/35; G06F 15/22; G06F 3/0484; G06F 3/0482; H04L 51/02; G10L 15/22
See application file for complete search history.

(56) References Cited

U.S. PATENT DOCUMENTS 6,311,150 B1 * 10/2001 Ramaswamy ........ G06F 40/279
                                                        704/1
9,424,840 B1    8/2016 Hart et al.
(Continued)

FOREIGN PATENT DOCUMENTS

JP        2008058813        3/2008

OTHER PUBLICATIONS

European Search Report dated May 6, 2019 issued in counterpart application No. 19155341.1-1207, 6 pages.
(Continued)

*Primary Examiner* — Justin R. Blaufeld
(74) *Attorney, Agent, or Firm* — The Farrell Law Firm, P.C.

(57) ABSTRACT

A system includes a communication interface, at least one processor, and at least one memory storing information about a plurality of chatbots and a plurality of categories of the chatbots. The memory may further store instructions that, when executed, cause the processor to receive from a client device including a user interface (UI), data associated with a voice-based or text-based user input associated with or indicative of a request to perform at least one task, to select at least one chatbot from the plurality of chatbots for at least one category for performing the at least one task among the plurality of categories of the plurality of chatbots, and to transmit information on the selected at least one chatbot and the at least one category via the communication interface to the client device such that the client device provides the information through the UI.

16 Claims, 17 Drawing Sheets

(51) Int. Cl.
*G06F 3/0484* (2022.01)
*H04L 51/02* (2022.01)
*G10L 15/22* (2006.01)
*G06F 40/35* (2020.01)
*G06F 16/9535* (2019.01)

(52) U.S. Cl.
CPC .............. *G10L 15/22* (2013.01); *H04L 51/02* (2013.01); *G06F 16/9535* (2019.01)

(56) References Cited

U.S. PATENT DOCUMENTS

| | | | |
|---|---|---|---|
| 9,548,066 B2 | 1/2017 | Jain et al. | |
| 9,734,138 B2 | 8/2017 | Rothwell et al. | |
| 10,026,394 B1 | 7/2018 | Carbon et al. | |
| 10,114,534 B2 | 10/2018 | Kasterstein et al. | |
| 2011/0153322 A1 | 6/2011 | Kwak et al. | |
| 2011/0307463 A1 | 12/2011 | Kasterstein et al. | |
| 2012/0226676 A1 | 9/2012 | Kasterstein et al. | |
| 2013/0311997 A1* | 11/2013 | Gruber .................... H04W 4/00 718/102 | |
| 2014/0040746 A1* | 2/2014 | Reich ...................... G06F 3/167 715/728 | |
| 2014/0279050 A1* | 9/2014 | Makar ................. G06F 16/9535 705/14.66 | |
| 2015/0112962 A1* | 4/2015 | Simhon ................. G06F 16/951 707/709 | |
| 2016/0042748 A1 | 2/2016 | Jain et al. | |
| 2016/0217784 A1* | 7/2016 | Gelfenbeyn ........ G06F 3/04842 | |
| 2016/0335532 A1 | 11/2016 | Sanghavi et al. | |
| 2017/0068651 A1 | 3/2017 | Rothwell et al. | |
| 2017/0132019 A1* | 5/2017 | Karashchuk ............ H04L 67/18 | |
| 2017/0180284 A1* | 6/2017 | Smullen ................ H04L 67/306 | |
| 2018/0025726 A1 | 1/2018 | Gatti de Bayser et al. | |
| 2018/0121405 A1 | 5/2018 | Rothwell et al. | |
| 2018/0190274 A1* | 7/2018 | Kirazci ............. G10L 15/22 | |
| 2018/0293601 A1* | 10/2018 | Glazier ............. G06Q 30/0214 | |
| 2018/0316634 A1* | 11/2018 | Driscoll ................ G06F 9/541 |
| 2021/0233527 A1* | 7/2021 | Aihara ................... G06F 3/167 |
| 2021/0249002 A1* | 8/2021 | Ahmadidaneshashtiani ................ G06F 40/284 |

OTHER PUBLICATIONS

International Search Report dated May 15, 2019 issued in counterpart application No. PCT/KR2019/001030, 4 pages.
European Search Report dated Jul. 1, 2021 issued in counterpart application No. 19155341.1-1210, 8 pages.

* cited by examiner

SYSTEM FOR PROCESSING USER UTTERANCE AND CONTROLLING METHOD THEREOF

CROSS-REFERENCE TO RELATED APPLICATION(S)

This application is based on and claims priority under 35 U.S.C. § 119 to Korean Patent Application No. 10-2018-0019610, filed on Feb. 20, 2018, in the Korean Intellectual Property Office, the disclosure of which is incorporated herein by reference its entirety.

BACKGROUND

1. Field

The present disclosure relates generally to a technology for processing a user utterance.

2. Description of Related Art

In addition to a conventional input method using a keyboard or a mouse, electronic devices have recently supported various input schemes such as a voice input. For example, electronic devices such as smart phones or tablet personal computers (PCs) may receive a user voice and then provide a service that performs an operation corresponding to the entered user voice.

A speech recognition service is being developed based on a technology for processing a natural language. The technology for processing a natural language refers to a technology that grasps the intent of a user utterance and generates the result matched with the intent to provide the user with the service.

An electronic device may provide a user with various services through an external server. An external server receives a user input from the electronic device and analyzes the received user input to provide a specified service. As the number of service types increase exponentially, it is difficult to analyze the user input corresponding to the specified service. In particular, as the number of services provided through an app developed by a third party increases exponentially, the external server analyzes the user input for each app with a system. As such, it is difficult for the external server to manage information necessary to select a system for processing a user input, and it may take a lot of time to select a system for analyzing the user input.

SUMMARY

The present disclosure has been made to address the above-mentioned problems and disadvantages, and to provide at least the advantages described below. Accordingly, an aspect of the present disclosure may provide a system for categorizing and providing information for performing a task corresponding to a user input.

In accordance with an aspect of the present disclosure, a system may include a communication interface, at least one processor operatively connected to the communication interface, and at least one memory operatively connected to the at least one processor. The at least one memory may store information about a plurality of chatbots, and a plurality of categories of the plurality of chatbots. The memory may further store instructions that, when executed, cause the processor to receive, via the communication interface from a client device including a user interface (UI), data associated with a voice-based or text-based user input associated with or indicative of a request to perform at least one task, to select at least one chatbot from the plurality of chatbots for at least one category for performing the at least one task among the plurality of categories of the plurality of chatbots, and to transmit information on the selected at least one chatbot and the at least one category via the communication interface to the client device such that the client device provides the information through the UI.

In accordance with another aspect of the present disclosure, a method for processing a user input may include receiving, from a client device including a UI, data associated with a voice-based or text-based user input associated with or indicative of a request to perform at least one task, selecting at least one chatbot from a plurality of chatbots for at least one category for performing the at least one task among a plurality of categories of the plurality of chatbots, and transmitting information on the selected at least one chatbot and the at least one category to the client device such that the client device provides the information through the UI.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the present disclosure may be described to be associated with accompanying drawings. Accordingly, those of ordinary skill in the art will recognize that modification, equivalent, and/or alternative on the various embodiments described herein can be variously made without departing from the scope and spirit of the present disclosure.

Before describing an embodiment of the disclosure, an integrated intelligent system to which an embodiment of the disclosure is applied will be described.

Figure 1:
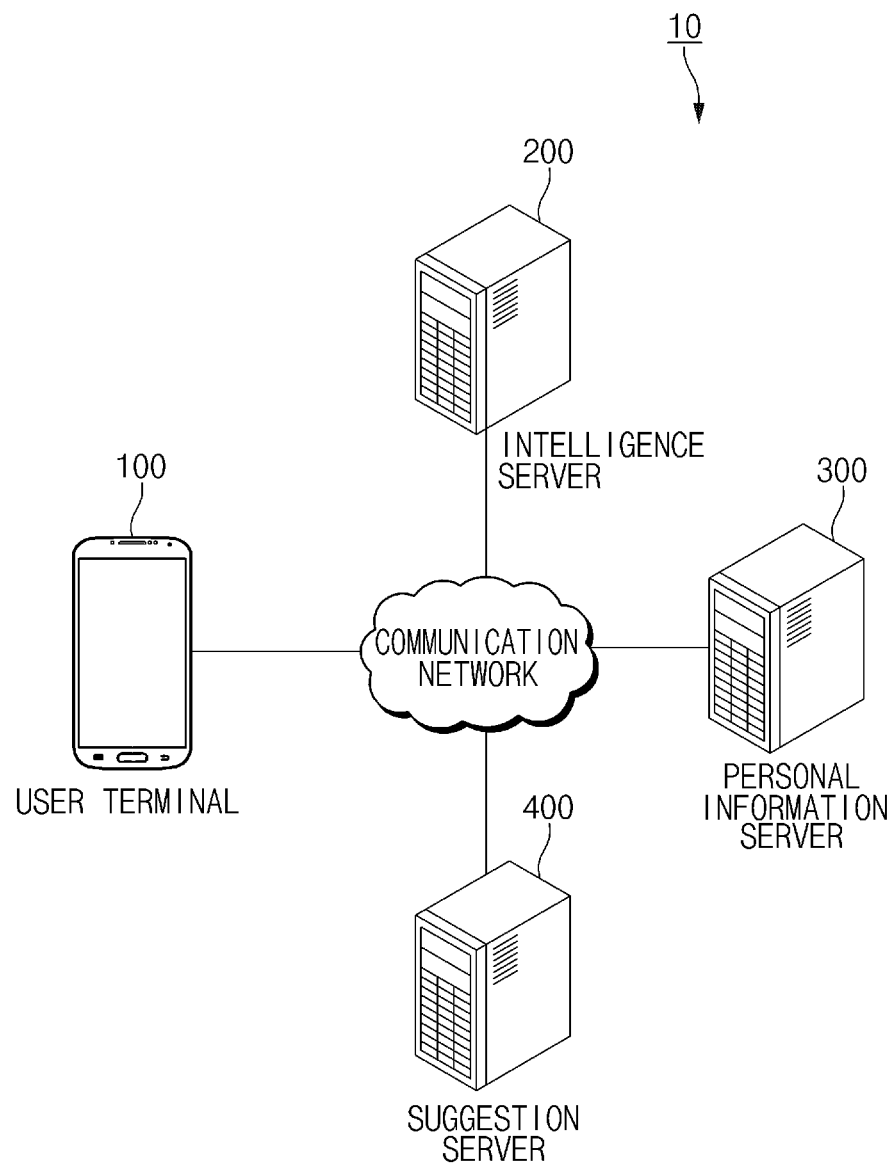
FIG. 1 is a view illustrating an integrated intelligent system, according to an embodiment.

FIG. 1 is a view illustrating an integrated intelligent system, according to various embodiments of the present disclosure.

Referring to FIG. 1, an integrated intelligent system 10 may include a user terminal 100, an intelligent server 200, a personal information server 300, or a suggestion server 400.

The user terminal 100 may provide a service for a user through an app (or an application program) (e.g., an alarm app, a message app, a picture (gallery) app, or the like) stored in the user terminal 100. For example, the user terminal 100 may launch and operate another app through an intelligence app (or speech recognition app) stored in the user terminal 100. The user terminal 100 may receive a user input for launching or operating the other app through the intelligence app. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may correspond to the user terminal 100.

According to an embodiment, the user terminal 100 may receive user utterance as a user input. The user terminal 100 may receive the user utterance and may generate a command for operating an app based on the user utterance. As such, the user terminal 100 may operate the app by using the command.

The intelligent server 200 may receive a voice input of a user from the user terminal 100 over a communication network and may convert the voice input to text data. In another embodiment, the intelligent server 200 may generate (or select) a path rule based on the text data. The path rule may include information about an action (or an operation) for performing the function of an app or information about a parameter utilized to perform the action. In addition, the path rule may include the order of the action of the app. The user terminal 100 may receive the path rule, may select an app depending on the path rule, and may execute the action included in the path rule in the selected app.

Generally, the term "path rule" of the present disclosure may indicate, but is not limited to, the sequence of states in which an electronic device performs the task requested by the user. In other words, the path rule may include information about the sequence of the states. For example, the task may be a certain action that the intelligence app is capable of providing. The task may include the generation of a schedule, the transmission of a picture to the desired other party, or the provision of weather information. The user terminal 100 may perform the task by sequentially having at least one or more states (e.g., an operating state of the user terminal 100).

According to an embodiment, the path rule may be provided or generated by an artificial intelligent (AI) system. The artificial intelligent system may be a rule-based system, or may be a neural network-based system (e.g., a feed forward neural network (FNN) or a recurrent neural network (RNN)). Alternatively, the artificial intelligent system may be a combination of the above-described systems or an artificial intelligent system different from the above-described system. According to an embodiment, the path rule may be selected from a set of predefined path rules or may be generated in real time in response to a user request. For example, the artificial intelligent system may select at least a path rule of predefined plurality of path rules, or may generate a path rule dynamically (or in real time). Furthermore, the user terminal 100 may use a hybrid system to provide the path rule.

According to an embodiment, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display the result of a part of the plurality of actions in the display. For example, the user terminal 100 may display the result, which is obtained by executing the last action, in the display. For another example, the user terminal 100 may receive the user input to display the result obtained by executing the action in the display.

The personal information server 300 may include a database in which user information is stored. For example, the personal information server 300 may receive the user information (e.g., context information, information about execution of an app, or the like) from the user terminal 100 and may store the user information in the database. The intelligent server 200 may receive the user information from the personal information server 300 over the communication network and may use the user information when generating a path rule associated with the user input. According to an embodiment, the user terminal 100 may receive the user information from the personal information server 300 over the communication network, and may use the user information as information for managing the database.

The suggestion server 400 may include a database storing information about a function in a terminal, introduction of an application, or a function to be provided. For example, the suggestion server 400 may receive the user information of the user terminal 100 from the personal information server 300 and may include the database storing information about a function that a user is capable of utilizing. The user terminal 100 may receive information about the function to be provided from the suggestion server 400 over the communication network and may provide the received information to the user.

Figure 2:
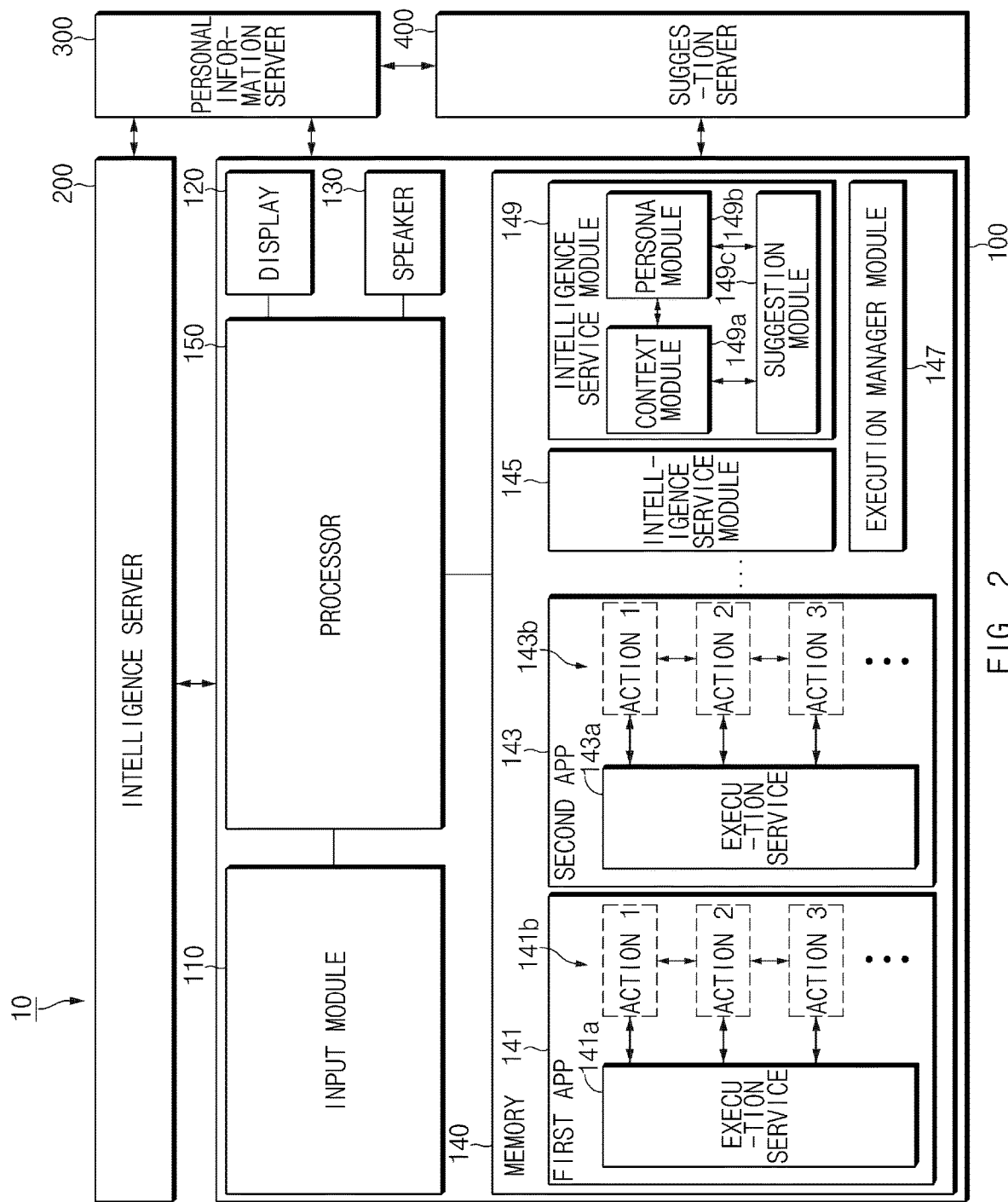
FIG. 2 is a block diagram illustrating a user terminal of an integrated intelligent system, according to an embodiment.

FIG. 2 is a block diagram illustrating a user terminal of an integrated intelligent system, according to an embodiment of the present disclosure.

Referring to FIG. 2, the user terminal 100 may include an input module 110, a display 120, a speaker 130, a memory 140, or a processor 150. The user terminal 100 may further include a housing, and elements of the user terminal 100 may be seated in the housing or may be positioned on the housing. The user terminal 100 may further include a communication circuit positioned in the housing. The user terminal 100 may transmit or receive data (or information) to or from an external server (e.g., the intelligent server 200) through the communication circuit.

According to an embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) placed in the user terminal 100 (or the housing of the user terminal 100).

According to an embodiment, the input module 110 may include a microphone that is capable of receiving the utterance of the user as a sound signal. For example, the input module 110 may include a speech input system and may receive the utterance of the user as a sound signal through the speech input system. For example, the microphone may be exposed through a part (e.g., a first portion) of the housing.

According to an embodiment, the display 120 may display an image, a video, and/or an execution screen of an application. For example, the display 120 may display a graphic user interface (GUI) of an app. According to an embodiment, the display 120 may be exposed to a part (e.g., a second part) of the housing.

According to an embodiment, the speaker 130 may output the sound signal. For example, the speaker 130 may output the voice signal generated in the user terminal 100 to the outside. According to an embodiment, the speaker 130 may be exposed to a part (e.g., a third part) of the housing.

According to an embodiment, the memory 140 may store a plurality of apps (or application program) 141 and 143. For example, the plurality of apps 141 and 143 may be a program for performing a function corresponding to the user input.

According to an embodiment, the memory 140 may store an intelligence agent 145, an execution manager module 147, or an intelligence service module 149. For example, the intelligence agent 145, the execution manager module 147 and the intelligence service module 149 may be a framework (or application framework) for processing the received user input (e.g., user utterance).

According to an embodiment, the memory 140 may include a database capable of storing information utilized to recognize the user input. For example, the memory 140 may include a log database capable of storing log information. For example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may operate after being loaded by the execution manager module 147. The plurality of apps 141 and 143 may include execution service modules 141*a* and 143*a* performing a function. In an embodiment, the plurality of apps 141 and 143 may perform a plurality of actions (e.g., a sequence of states) 141*b* and 143*b* through execution service modules 141*a* and 143*a* for the purpose of performing a function. In other words, the execution service modules 141*a* and 143*a* may be activated by the execution manager module 147, and then may execute the plurality of actions 141*b* and 143*b*.

According to an embodiment, when the actions 141*b* and 143*b* of the apps 141 and 143 are executed, an execution state screen according to the execution of the actions 141*b* and 143*b* may be displayed in the display 120. For example, the execution state screen may be a screen in a state where the actions 141*b* and 143*b* are completed. As another example, the execution state screen may be a screen in a state where the execution of the actions 141*b* and 143*b* is in partial landing (e.g., in the case where a parameter utilized for the actions 141*b* and 143*b* are not entered).

According to an embodiment, the execution service modules 141*a* and 143*a* may execute the actions 141*b* and 143*b* depending on a path rule. For example, the execution service modules 141*a* and 143*a* may be activated by the execution manager module 147, may receive an execution request from the execution manager module 147 depending on the path rule, and may execute functions of the apps 141 and 143 by performing the actions 141*b* and 143*b* depending on the execution request. When the execution of the actions 141*b* and 143*b* is completed, the execution service modules 141*a* and 143*a* may transmit completion information to the execution manager module 147.

According to an embodiment, in the case where the plurality of the actions 141*b* and 143*b* are respectively executed in the apps 141 and 143, the plurality of the actions 141*b* and 143*b* may be sequentially executed. When the execution of one action (e.g., action 1 of the first app 141 or action 1 of the second app 143) is completed, the execution service modules 141*a* and 143*a* may open the next action (e.g., action 2 of the first app 141 or action 2 of the second app 143) and may transmit the completion information to the execution manager module 147. Here, it is understood that opening an arbitrary action is to change a state of the arbitrary action to an executable state or to prepare the execution of the action. In other words, when the arbitrary action is not opened, the corresponding action may be not executed. When the completion information is received, the execution manager module 147 may transmit the execution request associated with the next action (e.g., action 2 of the first app 141 or action 2 of the second app 143) to the execution service modules 141*a* and 143*a*. According to an embodiment, in the case where the plurality of apps 141 and 143 are launched, the plurality of apps 141 and 143 may be sequentially launched. For example, when receiving the completion information after the execution of the last action (e.g., action 3 of the first app 141) of the first app 141 is executed, the execution manager module 147 may transmit the execution request of the first action (e.g., action 1 of the second app 143) of the second app 143 to the execution service module 143*a*.

According to an embodiment, in the case where the plurality of the actions 141*b* and 143*b* are executed in the apps 141 and 143, a result screen according to the execution of each of the executed plurality of the actions 141*b* and 143*b* may be displayed in the display 120. According to an embodiment, a part of a plurality of result screens according to the executed plurality of the actions 141*b* and 143*b* may be displayed in the display 120.

According to an embodiment, the memory 140 may store an intelligence app (e.g., a speech recognition app) operating in conjunction with the intelligence agent 145. The app operating in conjunction with the intelligence agent 145 may receive and process the utterance of the user as a voice signal. According to an embodiment, the app operating in conjunction with the intelligence agent 145 may be operated by a specific input (e.g., an input through a hardware key, an input through a touch screen, or a specific voice input) input through the input module 110.

According to an embodiment, the intelligence agent 145, the execution manager module 147, or the intelligence service module 149 stored in the memory 140 may be performed by the processor 150. The functions of the intelligence agent 145, the execution manager module 147, or the intelligence service module 149 may be implemented by the processor 150. It is described that the function of each of the intelligence agent 145, the execution manager module 147, and the intelligence service module 149 is the operation of the processor 150. According to an embodiment, the intelligence agent 145, the execution manager module 147, or the intelligence service module 149 stored in the memory 140 may be implemented with hardware as well as software.

According to an embodiment, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to execute a program and to read or store information.

In an embodiment, the processor 150 may execute the intelligence agent 145, the execution manager module 147, or the intelligence service module 149 stored in the memory 140. As such, the processor 150 may implement the function of the intelligence agent 145, the execution manager module 147, or the intelligence service module 149.

According to an embodiment, the processor 150 may execute the intelligence agent 145 to generate a command for launching an app based on the voice signal received as the user input. According to an embodiment, the processor 150 may execute the execution manager module 147 to launch the apps 141 and 143 stored in the memory 140 depending on the generated command. According to an embodiment, the processor 150 may execute the intelligence service module 149 to manage information of a user and may process a user input by using the information of the user.

The processor 150 may execute the intelligence agent 145 to transmit a user input received through the input module 110 to the intelligent server 200 and may process the user input through the intelligent server 200.

According to an embodiment, before transmitting the user input to the intelligent server 200, the processor 150 may execute the intelligence agent 145 to pre-process the user input. According to an embodiment, to pre-process the user input, the intelligence agent 145 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input and may search for a part in which the user voice is present, by using the detected end-point. The AGC module may recognize the user input and may adjust the volume of the user input so as to be suitable to process the recognized user input. According to an embodiment, the processor 150 may execute all the pre-processing elements for performance. However, in another embodiment, the processor 150 may execute a part of the pre-processing elements to operate at low power.

According to an embodiment, the intelligence agent 145 may execute a wakeup recognition module stored in the memory 140 for the purpose of recognizing a call of a user. As such, the processor 150 may recognize the wakeup command of a user through the wakeup recognition module and may execute the intelligence agent 145 for receiving user input when receiving the wakeup command. The wakeup recognition module may be implemented with a low-power processor (e.g., a processor included in an audio codec). According to an embodiment, when receiving a user input through a hardware key, the processor 150 may execute the intelligence agent 145. In the case where the intelligence agent 145 is executed, an intelligence app (e.g., a speech recognition app) operating in conjunction with the intelligence agent 145 may be executed.

According to an embodiment, the intelligence agent 145 may include an utterance recognition module for performing the user input. The processor 150 may recognize the user input for executing an action in an app through the utterance recognition module. For example, the processor 150 may recognize a limited user (voice) input (e.g., an utterance such as "click" for performing a capture operation when a camera app is being executed) for performing an action such as the wakeup command in the apps 141 and 143 through the utterance recognition module. For example, the processor 150 may assist the intelligent server 200 to recognize and rapidly process a user command capable of being processed in the user terminal 100 through the utterance recognition module. According to an embodiment, the utterance recognition module of the intelligence agent 145 for executing a user input may be implemented in an app processor.

According to an embodiment, the utterance recognition module (including the utterance recognition module of a wake up module) of the intelligence agent 145 may recognize the user input by using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the processor 150 may execute the intelligence agent 145 to convert the voice input of the user into text data. For example, the processor 150 may transmit the voice of the user to the intelligent server 200 through the intelligence agent 145 and may receive the text data corresponding to the voice of the user from the intelligent server 200. As such, the processor 150 may display the converted text data in the display 120.

According to an embodiment, the processor 150 may execute the intelligence agent 145 to receive a path rule from the intelligent server 200. According to an embodiment, the processor 150 may transmit the path rule to the execution manager module 147 through the intelligence agent 145.

According to an embodiment, the processor 150 may execute the intelligence agent 145 to transmit the execution result log according to the path rule received from the intelligent server 200 to the intelligence service module 149, and the transmitted execution result log may be accumulated and managed in preference information of the user of a persona module 149b.

According to an embodiment, the processor 150 may execute the execution manager module 147, may receive the path rule from the intelligence agent 145, and may execute the apps 141 and 143; and the processor 150 may allow the apps 141 and 143 to execute the actions 141b and 143b included in the path rule. For example, the processor 150 may transmit command information (e.g., path rule information) for executing the actions 141b and 143b to the apps 141 and 143, through the execution manager module 147; and the processor 150 may receive completion information of the actions 141b and 143b from the apps 141 and 143.

According to an embodiment, the processor 150 may execute the execution manager module 147 to transmit the command information (e.g., path rule information) for executing the actions 141b and 143b of the apps 141 and 143 between the intelligence agent 145 and the apps 141 and 143. The processor 150 may bind the apps 141 and 143 to be executed depending on the path rule through the execution manager module 147 and may transmit the command information (e.g., path rule information) of the actions 141b and 143b included in the path rule to the apps 141 and 143. For example, the processor 150 may sequentially transmit the actions 141b and 143b included in the path rule to the apps 141 and 143, through the execution manager module 147 and may sequentially execute the actions 141b and 143b of the apps 141 and 143 depending on the path rule.

According to an embodiment, the processor 150 may execute the execution manager module 147 to manage execution states of the actions 141b and 143b of the apps 141 and 143. For example, the processor 150 may receive information about the execution states of the actions 141b and 143b from the apps 141 and 143, through the execution manager module 147. For example, in the case where the execution states of the actions 141b and 143b are in partial landing (e.g., in the case where a parameter utilized for the actions 141b and 143b are not input), the processor 150 may transmit information about the partial landing to the intelligence agent 145, through the execution manager module 147. The processor 150 may make a request for an input of information (e.g., parameter information) to the user by using the received information through the intelligence agent 145. In another example, in the case where the execution state of each of the actions 141b and 143b is an operating state, the processor 150 may receive an utterance from the user through the intelligence agent 145. The processor 150 may transmit information about the apps 141 and 143 being executed and the execution states of the apps 141 and 143 to the intelligence agent 145, through the execution manager module 147. The processor 150 may transmit the user utterance to the intelligent server 200 through the intelligence agent 145. The processor 150 may receive parameter information of the utterance of the user from the intelligent server 200 through the intelligence agent 145. The processor 150 may transmit the received parameter information to the execution manager module 147 through the intelligence agent 145. The execution manager module 147 may change a parameter of each of the actions 141b and 143b to a new parameter by using the received parameter information.

According to an embodiment, the processor 150 may execute the execution manager module 147 to transmit parameter information included in the path rule to the apps 141 and 143. In the case where the plurality of apps 141 and 143 are sequentially executed depending on the path rule, the execution manager module 147 may transmit the parameter information included in the path rule from one app to another app.

According to an embodiment, the processor may execute the execution manager module 147 to receive a plurality of path rules. The processor 150 may receive a plurality of path rules through the execution manager module 147 based on the utterance of a user. For example, in the case where the user utterance specifies one app 141 executing one action 141b but does not specify the other app 143 executing the other action 143b, the processor 150 may receive a plurality of different path rules, in which the same app 141 (e.g., a gallery app) executing the one action 141b is executed and in which the different app 143 (e.g., message app or Telegram app) executing the other action 143b is executed, through the execution manager module 147. For example, the processor 150 may execute the same actions 141b and 143b (e.g., the same successive actions 141b and 143b) of the plurality of path rules, through the execution manager module 147. In the case where the execution manager module 147 executes the same action, the processor 150 may display a state screen for selecting the different apps 141 and 143 respectively included in the plurality of path rules in the display 120, through the execution manager module 147.

According to an embodiment, the intelligence service module 149 may include a context module 149a, the persona module 149b, or a suggestion module 149c.

The processor 150 may execute the context module 149a to collect current states of the apps 141 and 143 from the apps 141 and 143. For example, the processor 150 may execute the context module 149a to receive context information indicating the current states of the apps 141 and 143 and may collect the current states of the apps 141 and 143 through the received context information.

The processor 150 may execute the persona module 149b to manage personal information of the user utilizing the user terminal 100. For example, the processor 150 may execute the persona module 149b to collect usage information and the execution result of the user terminal 100 and may manage the personal information of the user by using the collected usage information and the collected execution result of the user terminal 100.

The processor 150 may execute the suggestion module 149c to predict the intent of the user and may recommend a command to the user based on the intent of the user. For example, the processor 150 may execute the suggestion module 149c to recommend a command to the user depending on the current state (e.g., a time, a place, a situation, or an app) of the user.

Figure 3:
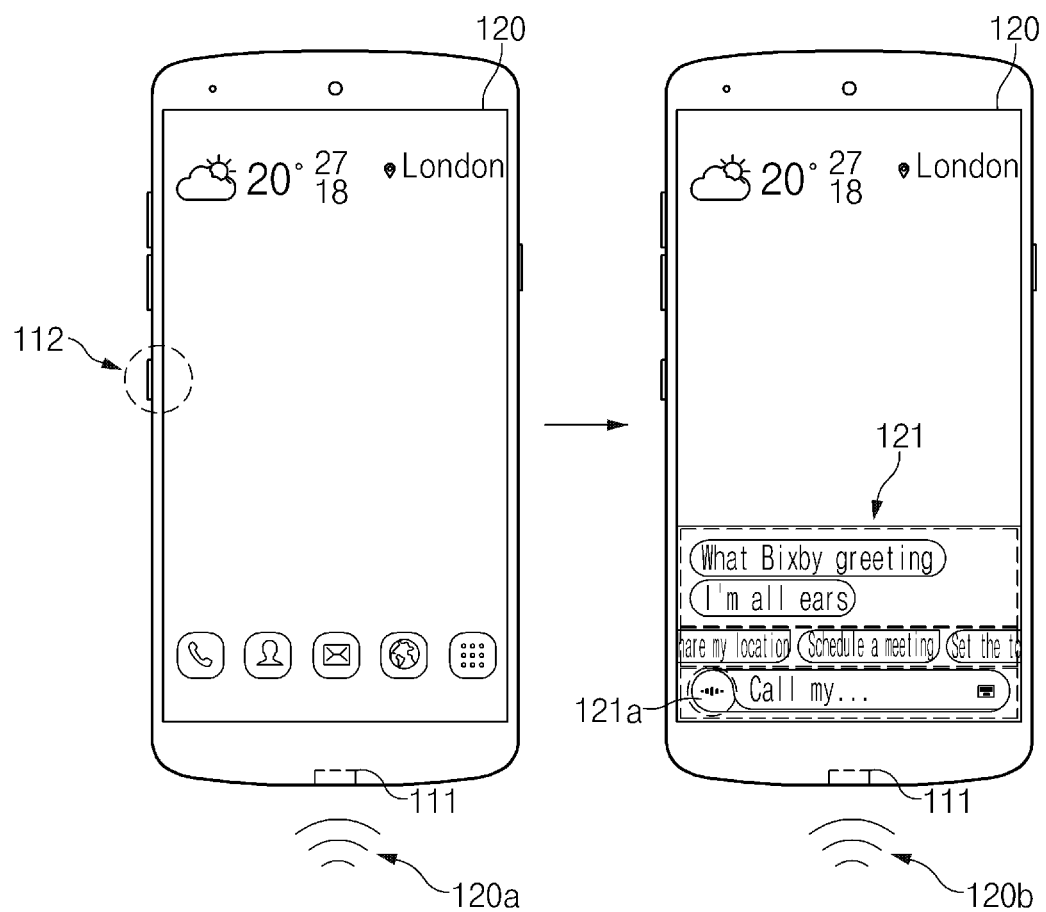
FIG. 3 illustrates an intelligence app of a user terminal, according to an embodiment.

FIG. 3 is a view illustrating that an intelligence app of a user terminal is executed, according to an embodiment of the present disclosure.

FIG. 3 illustrates that the user terminal 100 receives a user input to execute an intelligence app (e.g., a speech recognition app) operating in conjunction with the intelligence agent 145.

According to an embodiment, the user terminal 100 may execute the intelligence app for recognizing a voice through a hardware key 112. For example, in the case where the user terminal 100 receives the user input through the hardware key 112, the user terminal 100 may display a UI 121 of the intelligence app in the display 120. For example, a user may touch a speech recognition button 121a to the UI 121 of the intelligence app for the purpose of entering a voice 120b in a state where the UI 121 of the intelligence app is displayed in the display 120. For another example, the user may continuously press the hardware key 112 to enter the voice 120b.

According to an embodiment, the user terminal 100 may execute the intelligence app for recognizing a voice through a microphone 111. For example, in the case where a specified voice (e.g., wake up!) is entered 120a through the microphone 111, the user terminal 100 may display the UI 121 of the intelligence app in the display 120.

Figure 4:
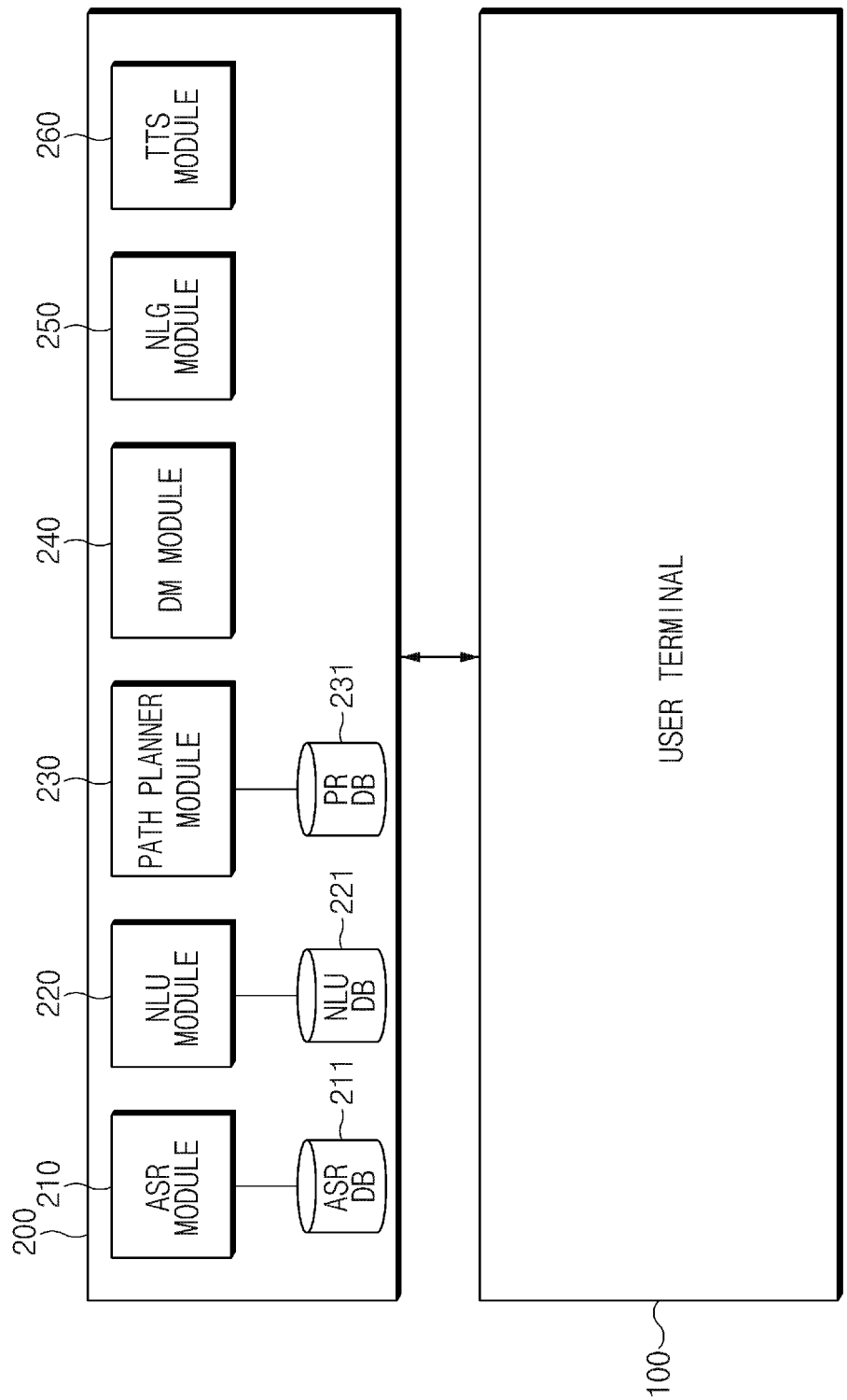
FIG. 4 is a block diagram illustrating an intelligent server of an integrated intelligent system, according to an embodiment.

FIG. 4 is a block diagram illustrating an intelligent server of an integrated intelligent system, according to an embodiment of the present disclosure.

Referring to FIG. 4, the intelligent server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. According to an embodiment, the intelligent server 200 may include a communication circuit, a memory, and a processor. The processor may execute an instruction stored in the memory to drive the ASR module 210, the NLU module 220, the path planner module 230, the DM module 240, the NLG module 250, and the TTS module 260. The intelligent server 200 may transmit or receive data (or information) to or from an external electronic device (e.g., the user terminal 100) through the communication circuit.

The NLU module 220 or the path planner module 230 of the intelligent server 200 may generate a path rule.

According to an embodiment, the ASR module 210 may convert the user input (e.g., voice data) received from the user terminal 100 to text data. For example, the ASR module 210 may include an utterance recognition module. The utterance recognition module may include an acoustic model and a language model. For example, the acoustic model may include information associated with phonation, and the language model may include unit phoneme information and information about a combination of unit phoneme information. The utterance recognition module may change user speech to text data by using the information associated with phonation and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) utilized for the user input to express the intent.

According to an embodiment, the NLU module 220 may determine the intent of the user and parameter by using a matching rule that is divided into a domain, intent, and a parameter (or a slot) utilized to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more parameters. The matching rule may be stored in a natural language understanding database (NLU DB) 221.

According to an embodiment, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words, which are the basis for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action (e.g., at least one or more states) to be executed in the app, and a parameter utilized to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter utilized to execute the action based on the intent of the user input and the parameter for the purpose of generating one path rule or a plurality of path rules. For example, by using information of the user terminal 100, the NLU module 220 may arrange the app to be executed and the action to be executed in the app depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, in the case where a part of actions is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where a part of actions is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form.

For example, the path planner module 230 may transmit a path rule set corresponding to information (e.g., OS information or app information) of the user terminal 100, which is received from the intelligence agent 145, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may map the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is definite. For example, the DM module 240 may determine whether the user intent is definite, based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for information to the user. For example, the DM module 240 may perform a feedback for making a request for information about the parameter for grasping the user intent.

According to an embodiment, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 5:
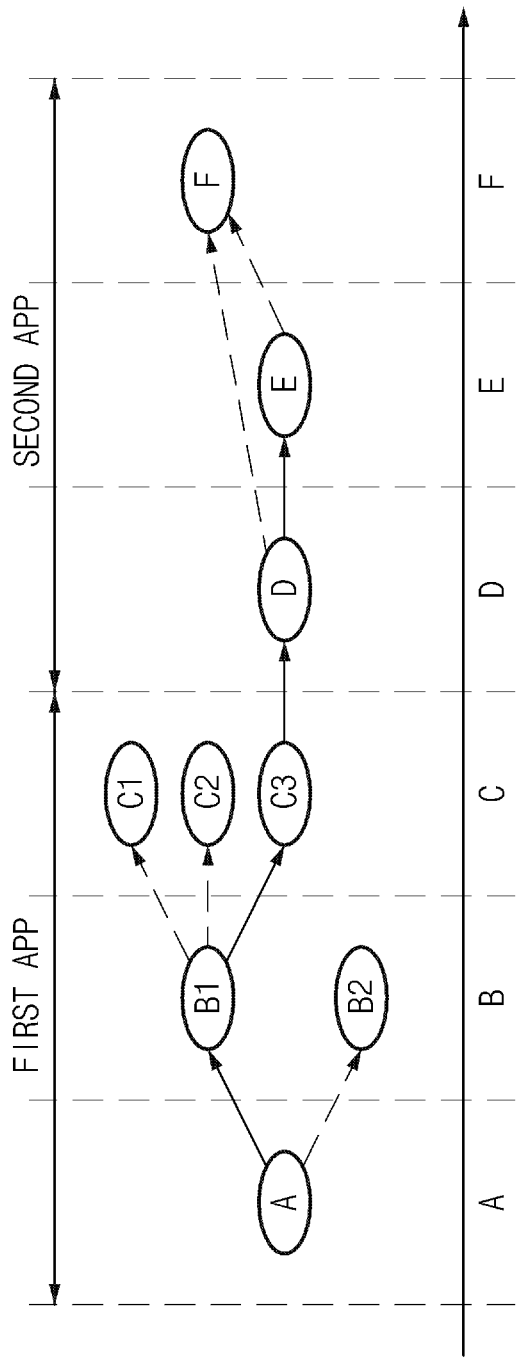
FIG. 5 is a diagram illustrating a path rule generating method of a path planner module, according to an embodiment.

FIG. 5 is a diagram illustrating a path rule generating method of a path planner module, according to an embodiment.

Referring to FIG. 5, the NLU module 220 may divide the function of an app into any one action (e.g., state A to state F) and may store the divided unit actions in the PR DB 231. For example, the NLU module 220 may store a path rule set including a plurality of path rules (e.g., A-B1-C1, A-B1-C2, A-B1-C3-D-F, and A-B1-C3-D-E-F) divided into the one action, in the PR DB 231.

The PR DB 231 of the path planner module 230 may store the path rule set for performing the function of an app. The path rule set may include a plurality of path rules each of which includes a plurality of actions (e.g., a sequence of states). An action executed depending on a parameter entered to each of the plurality of actions included in each of the plurality of path rules may be sequentially arranged. The plurality of path rules implemented in a form of ontology or a graph model may be stored in the PR DB 231.

The NLU module 220 may select an optimal path rule (e.g., A-B1-C3-D-F) of the plurality of path rules (e.g., A-B1-C1, A-B1-C2, A-B1-C3-D-F, and A-B1-C3-D-E-F) corresponding to the intent of a user input and the parameter.

Where there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 and may transmit the selected one path rule to the user terminal 100.

According to another embodiment, the NLU module 220 may determine the intent of a user and the parameter corresponding to the user input (e.g., an input for selecting C3) additionally entered by the user terminal 100 and may transmit the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, in the case where a user input in which information is insufficient is received by the intelligent server 200, the NLU module 220 may generate a path rule partly corresponding to the received user input. For example, the NLU module 220 may transmit the partly corresponding path rule to the intelligence agent 145. The processor 150 may execute the intelligence agent 145 to receive the path rule and may transmit the partly corresponding path rule to the execution manager module 147. The processor 150 may execute the first app 141 depending on the path rule through the execution manager module 147. The processor 150 may transmit information about an insufficient parameter to the intelligence agent 145 while executing the first app 141 through the execution manager module 147. The processor 150 may make a request for an additional input to a user by using the information about the insufficient parameter, through the intelligence agent 145. When an additional input is received by a user through the intelligence agent 145, the processor 150 may transmit and process a user input to the intelligent server 200. The NLU module 220 may generate a path rule to be added, based on the intent of the user input additionally entered and parameter information and may transmit the path rule to be added, to the intelligence agent 145. The processor 150 may transmit the path rule to the execution manager module 147 through the intelligence agent 145, and may execute the second app 143 depending on the path rule through the execution manager module 147.

According to an embodiment, in the case where a user input, in which a portion of information is missed, is received by the intelligent server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is partly missed, by using the user information. As such, even though the user input in which a portion of information is missed is received by the intelligent server 200, the NLU module 220 may make a request for the missed information to receive an additional input or may determine a path rule corresponding to the user input by using user information.

According to an embodiment, Table 1 attached below may indicate an example form of a path rule associated with a task that a user requests.

TABLE 1

| Path rule ID | State | Parameter |
| --- | --- | --- |
| Gallery_101 | PictureView 25 | NULL |
|  | SearchView 26 | NULL |
|  | SearchViewResult 27 | Location, time |
|  | SearchEmptySelectedView 28 | NULL |
|  | SearchSelectedView 29 | ContentType, selectall |
|  | CrossShare 30 | anaphora |

Referring to Table 1, a path rule that is generated or selected by the intelligent server 200 depending on user utterance (e.g., "please share a picture") may include at least one state 25, 26, 27, 28, 29 or 30. For example, the at least one state (e.g., one operating state of a terminal) may correspond to at least one of the picture application execution PicturesView state 25, the picture search function execution SearchView state 26, the search result display screen output SearchViewResult state 27, the search result display screen output, in which a picture is non-selected, SearchEmptySelectedView state 28, the search result display screen output, in which at least one picture is selected, SearchSelectedView state 29, or the share application selection screen output CrossShare state 30.

In an embodiment, parameter information of the path rule may correspond to at least one state. For example, the selected at least one picture may be included in the SearchSelectedView state 29.

The task (e.g., "please share a picture!") that the user requests may be performed depending on the execution result of the path rule including the sequence of the states 25, 26, 27, 28, and 29.

According to various embodiments, an NLU module may classify a specified service into at least one category, may select the category, may determine an app (or a domain) for performing a task corresponding to a user input, and may reduce the number of apps necessary to analyze the relation with the user input, thereby providing a user with an execution result of the task through a chatbot server included in the selected category.

Figure 6:
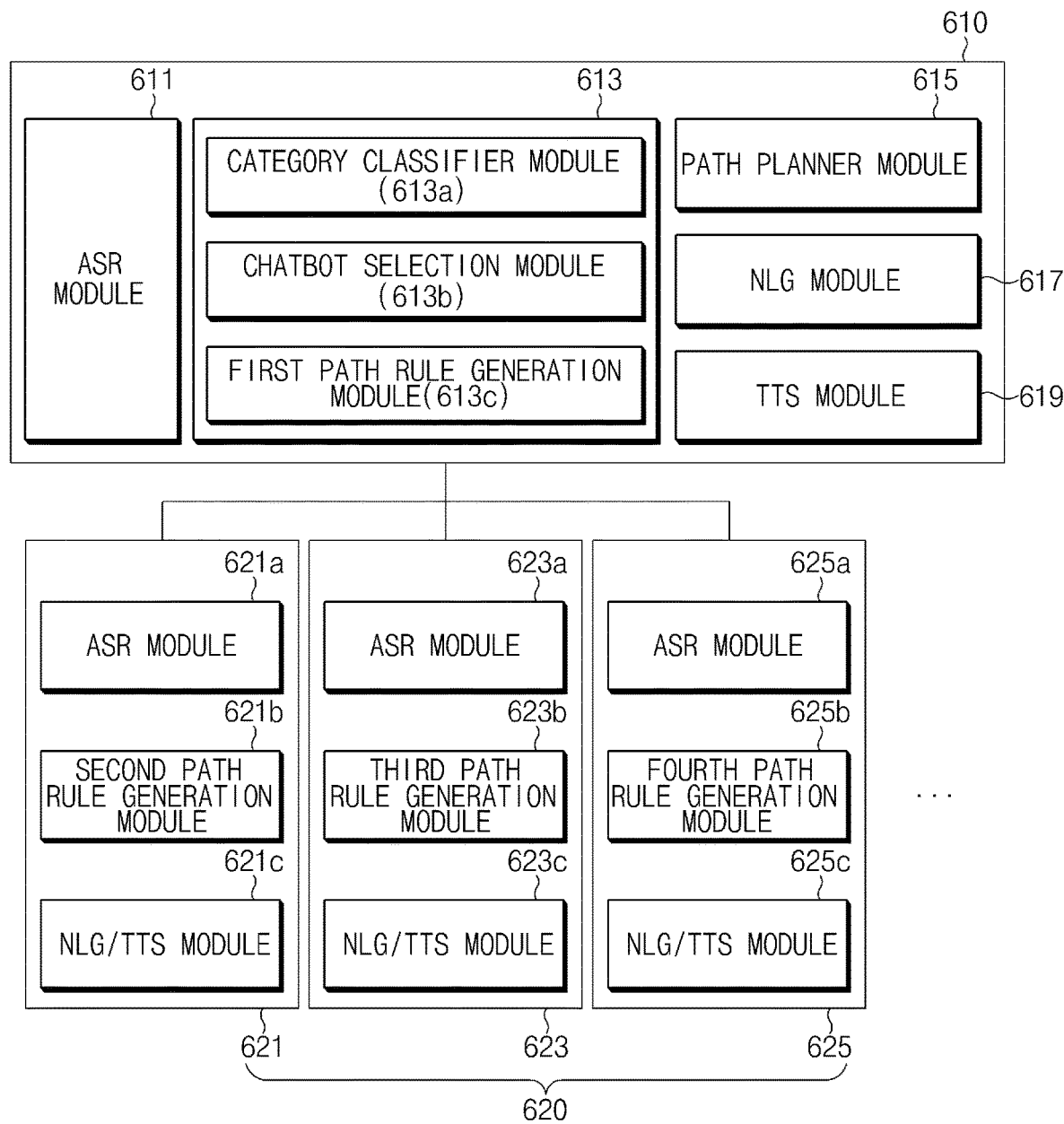
FIG. 6 is a diagram illustrating a configuration of a natural language understanding (NLU) module that classifies a category to process a user input, according to an embodiment.

FIG. 6 is a diagram illustrating a configuration of an intelligent server including an NLU module that classifies a category to process a user input, according to an embodiment.

Referring to FIG. 6, an intelligent server 610 may provide a response for providing a service corresponding to a user input (e.g., a user utterance). For example, like the intelligent server 200 of FIG. 4, the intelligent server 610 may receive the user input from a user terminal and provide the response corresponding to the user input.

The intelligent server 610 may provide the service corresponding to the user input through a chatbot server (or a chatbot) 620. For example, the intelligent server 610 may transmit information associated with the user input to the chatbot server 620, and the chatbot server 620 may provide the user terminal (e.g., the user terminal 100 of FIG. 4) with the service corresponding to the user input. For example, the chatbot server 620 may be a server that is operated by an entity (or a 3rd party) different than an entity operating the intelligent server 610. According to various embodiments, the chatbot server 620 may provide a user with the service through a specified app. For example, the chatbot server 620 may receive information about the user input from the intelligent server 610 and may provide the user terminal with a service corresponding to the received information.

The intelligent server 610 may include an ASR module 611, an NLU module 613, a path planner module 615, a natural language generation (NLG) module 617, or a text-to-speech (TTS) module 619. According to an embodiment, the ASR module 611, the path planner module 615, the NLG module 617, and the TTS module 619 may be similar to the ASR module 210, the path planner module 230, the NLG module 250, and the TTS module 260 of FIG. 4, respectively. As such, an operation of the intelligent server 610 will be described for the NLU module 613.

The configuration of the intelligent server 610 may be implemented with a hardware module performing each function. The intelligent server 610 may include a communication interface (or a network interface), at least one memory, and at least one processor, which implements a function corresponding to the configuration. The communication interface and the memory may be operatively connected to the processor. The memory may store instructions that, when executed, cause the processor to perform a function corresponding to the configuration by performing a specified operation.

The intelligent server 610 may receive a user input from a user terminal 100. For example, the intelligent server 610 may receive the received user input. For example, the user input may be at least one of a user input based on a voice and a user input based on a text. The user input based on the voice may be changed into text data through the ASR module 611.

The NLU module 613 may select a domain for processing a user input. For example, the domain may correspond to the chatbot server 620 capable of providing the service corresponding to the user input. The NLU module 613 may provide the service corresponding to the user input through the chatbot server 620 corresponding to the selected domain. The NLU module 613 may include a category classifier module 613a, a chatbot selection module 613b, and a first path rule generation module 613c. The NLU module 613 may select a domain for processing a user utterance including a specified word. The domain may correspond to a chatbot server 621, 623, or 625 providing the specified service. For example, when the specified word (i.e., an application name) is included in a user input, the NLU module 613 may select the domain corresponding to the specified word.

The NLU module 613 may select a category corresponding to a user input and may select a domain for processing the user input in the selected category. In other words, the NLU module 613 may select at least one chatbot from a plurality of chatbots corresponding to at least one category among a plurality of chatbot categories to perform at least one task. For example, when the specified word (e.g., an application name) is not included in the user utterance, the NLU module 613 may analyze the user input to select a domain. The NLU module 613 may select the at least one chatbot based on at least one of the usage frequency of the chatbot server 620, a user preference, and the processing speed of the chatbot server 620. The NLU module 613 may select a domain for processing a task corresponding to the user input through the category classifier module 613a and the chatbot selection module 613b. The category classifier module 613a may determine the category of a domain for performing a task corresponding to the user input. For example, the category classifier module 613a may determine the category of the domain based on the user input. The domain may be divided into a plurality of categories depending on criteria, such as the purpose or function of the service provided by the chatbot server 621, 623, or 625 (or an app). In addition, the category may be defined by an administrator operating an intelligent server including the intelligent server 610. The intelligent server 610 may store information about the plurality of chatbot servers 620, and categories of the plurality of chatbot servers 620 in a database (or a memory).

The chatbot selection module (i.e., a domain selection module) 613b may select a domain for performing a task corresponding to the user input among domains included in the determined category. For example, the chatbot selection module 613b may select the domain based on the user input. The first path rule generation module 613c may include an intent classifier module and a slot tagger module. The intent classifier module may determine the intent corresponding to the user input. The slot tagger module may generate (or select) a parameter for performing a task according to the determined intent. The first path rule generation module 613c may generate (or select) a path rule corresponding to the user input through the intent classifier module and the slot tagger module.

When the NLU module 613 is capable of performing the task corresponding to the user input through a plurality of chatbot servers 621, 623, and 625, the NLU module 613 may process the received user input through the plurality of chatbot servers 621, 623, and 625. For example, when the NLU module 613 is capable of performing the task corresponding to the user input through the first path rule generation module 613c, the NLU module 613 may process the received user input through the first path rule generation module 613c.

The plurality of chatbot servers 620 may provide a user (or a user terminal) with a response for providing a specified service. In other words, the plurality of chatbot servers 620 may provide the specified service through the interaction with the user. The plurality of chatbot servers 620 may correspond to a plurality of apps (or domains) for providing the specified service, respectively. The plurality of chatbot servers 620 may include the first chatbot server 621, the second chatbot server 623, and the third chatbot server 625, which respectively provide specified services. The first chatbot server 621, the second chatbot server 623, and the third chatbot server 625 may operate independently of each other.

Each of the plurality of chatbot servers 620 may process the user input associated with the specified service. Additionally, the plurality of chatbot servers 620 may process the user input for performing tasks different than each other. For example, the task may be processed through a website or may be processed through an app. The plurality of chatbot servers 620 may include ASR modules 621a, 623a, and 625a, path rule generation modules 621b, 623b, and 625b, and NLG/TTS modules 621c, 623c, and 625c for the purpose of processing the user input. The ASR modules 621a, 623a, and 625a and the NLG/TTS modules 621c, 623c, and 625c of the plurality of chatbot servers 620 may be similar to the ASR module 611, the NLG module 617, and the TTS module 619 of the intelligent server 610.

The path rule generation module 621b, 623b, or 625b may include an intent classifier module for grasping the user's intent and a slot tagger module that generates a parameter for performing the task according to the intent. The path rule generation module 621b, 623b, or 625b may generate a path rule corresponding to the user input by using the grasped intent and the parameter. The chatbot server 621, 623, or 625 may generate a response corresponding to the user input based on the grasped intent and the parameter. For example, the response may include the result from performing the task corresponding to the user input. The result from performing the task may be generated by using the path rule generated by the path rule generation module 621b, 623b, or 625b. As such, the chatbot server 621, 623, or 625 may provide, in advance, the user with the result from performing the task corresponding to the user input.

The path rule generation module 621b, 623b, or 625b may generate (or select) a path rule for providing a specified service. For example, each of the second path rule generation module 621b, the third path rule generation module 623b, and the fourth path rule generation module 625b may generate a path rule for providing services different from each other.

At least one chatbot server 621, 623, or 625 corresponding to a domain included in a category determined depending on the user's input may execute the task corresponding to the user input to generate the executed result. The at least one chatbot server 621, 623, or 625 may provide the user with a response including the generated result. As such, the intelligent server 610 may continuously provide a service corresponding to the user input by interacting with the user.

Figure 7:
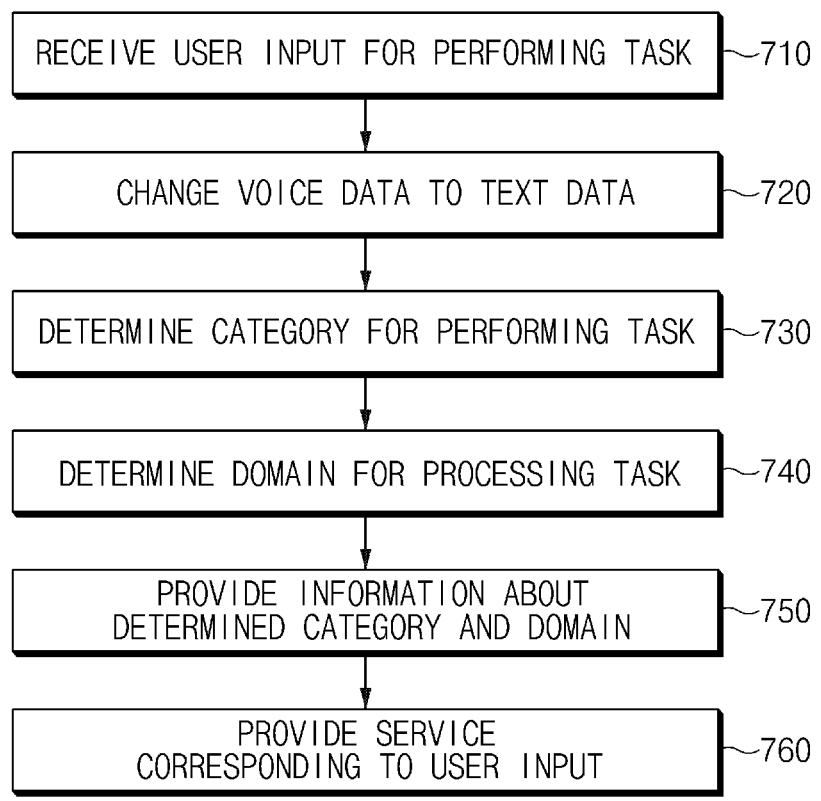
FIG. 7 is a flowchart illustrating a method in which an NLU module determines a domain based on a category, according to an embodiment.

FIG. 7 is a flowchart illustrating a method in which an NLU module determines a domain depending on a category, according to an embodiment.

In step 710, the intelligent server 610 receives a first user input for performing at least one task from a user terminal (or a client device) 100. The first user input may not include a specified word (e.g., an application name). The user terminal 100 may include a UI and may receive or transmit the first user input through the UI.

In step 720, the ASR module 611 of the intelligent server 610 changes voice data included in the user input to text data.

In step 730, the category classifier module 613a of the intelligent server 610 determines (or selects) at least one category for performing a task corresponding to the user input among a plurality of categories.

In step 740, the chatbot selection module 613b of the intelligent server 610 determines a domain for processing the task among domains included in the determined category. For example, the intelligent server 610 may select a plurality of domains included in the determined category, as domains for processing the task.

In step 750, the intelligent server 610 transmits information about the selected category and the selected domain to the user terminal. For example, the intelligent server 610 may perform at least part of a task corresponding to the user input using the chatbot server 621, 623, or 625 corresponding to the selected domain and may transmit the result of performing the at least part of the task, to the user terminal 100. The user terminal 100 may provide a user with the information through a UI. For example, the UI may include a GUI including at least one section for at least one category. The user terminal 100 may receive a second user input for continuously providing a service corresponding to a first user input through the information provided to the user. For example, the second user input may be an input for selecting at least one of a plurality of domains included in the received information.

In step 760, the intelligent server 610 receives the second user input and may provide the service corresponding to a user input through the chatbot server 621, 623, or 625 corresponding to the second user input. For example, the user may be provided with a specified service via a website or an app.

Figure 8:
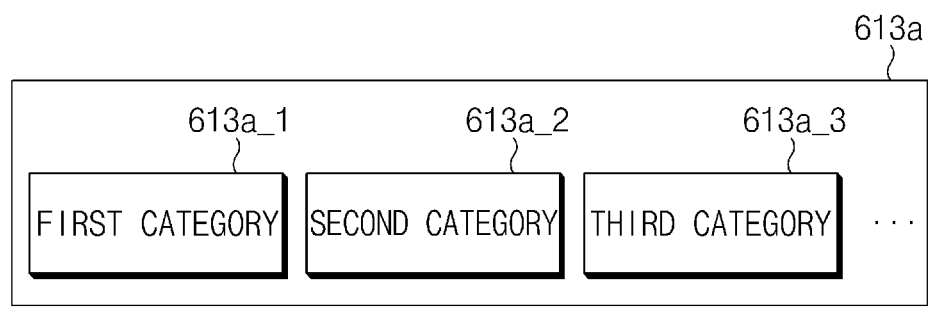
FIG. 8 is a diagram illustrating a configuration of a category of a category classifier module, according to an embodiment.
Figure 9:
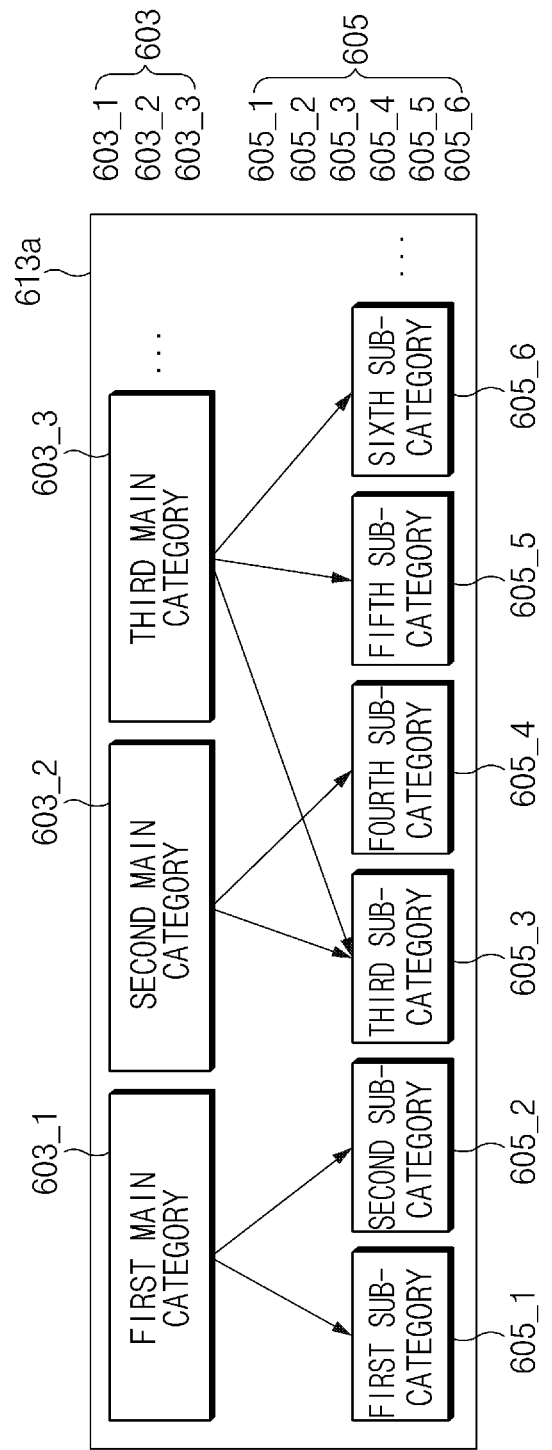
FIG. 9 is a diagram illustrating a configuration of a category of a category classifier module, according to an embodiment.

FIGS. 8 and 9 are diagrams illustrating a configuration of a category of a category classifier module, according to an embodiment.

Referring to FIG. 8, the category classifier module 613a includes categories 613a_1, 613a_2, and 613a_3, each of which has a single level. In other words, a plurality of domains may be divided into the categories 613a_1, 613a_2, and 613a_3, each of which has a single level.

The category classifier module 613a may select one category of the plurality of categories 613a_1, 613a_2, and 613a_3, each of which is composed of a single level, based on a user input. For example, when the category classifier module 613a receives a user input saying that "please book a movie!", the category classifier module 613a may select the first category 613a_1 corresponding to the "movie". The intelligent server 610 may provide a "movie booking" service through the chatbot server 621, 623, or 625 corresponding to the domain included in the first category 613a_1.

Referring to FIG. 9, the category classifier module 613a may include hierarchical categories 603 and 605. In other words, a plurality of domains may be divided into a plurality of main categories 603 and a plurality of sub-categories 605 (e.g., two levels). One main category 603_1, 6032, or 603_3 may include at least one or more sub-categories 605_1 to 605_6. For example, one of the sub-categories 605_1 to 605_6 may correspond to at least one main category 603_1, 603_2, or 603_3.

The category classifier module 613a may sequentially select the categories 603 and 605, each of which is composed of a plurality of levels, to perform a task corresponding to a user input. For example, when the category classifier module 613a receives a user input saying that "please book a movie!", the category classifier module 613a may select the first main category 603_1 corresponding to "book" and may select the first sub-category 605_1 corresponding to "movie" among the first sub-category 605_1 and the second sub-category 605_2 included in the selected first main category 603_1. The second sub-category 6052 corresponding to "theater/musical" may not be selected. The intelligent server 610 may provide the "movie booking" service through the chatbot server 621, 623, or 625 corresponding to the domain included in the second sub-category 605_2.

When information included in the user input is not sufficient to determine a category (or when there is a conflict between categories), the category classifier module 613a may select only the main category 603_1, 6032, or 6033 (or an upper category). For example, when the category classifier module 613a receives a user input saying "please book!", the category classifier module 613a may select the first main category 603_1; however, the category classifier module 613a may not select one of the first sub-category 605_1 and the second sub-category 605_2 included in the selected first main category 603_1. In this case, the intelligent server 610 may provide a "movie booking" service and a "theater/musical booking" service through the chatbot server 621, 623, or 625 corresponding, not to a sub-category, but the first main category 603_1.

The category classifier module 613a may organize a category, which is composed of not only two levels but also three or more levels. For example, the level of the category may be determined depending on the processing speed (or efficiency) of the user input.

Figure 10:
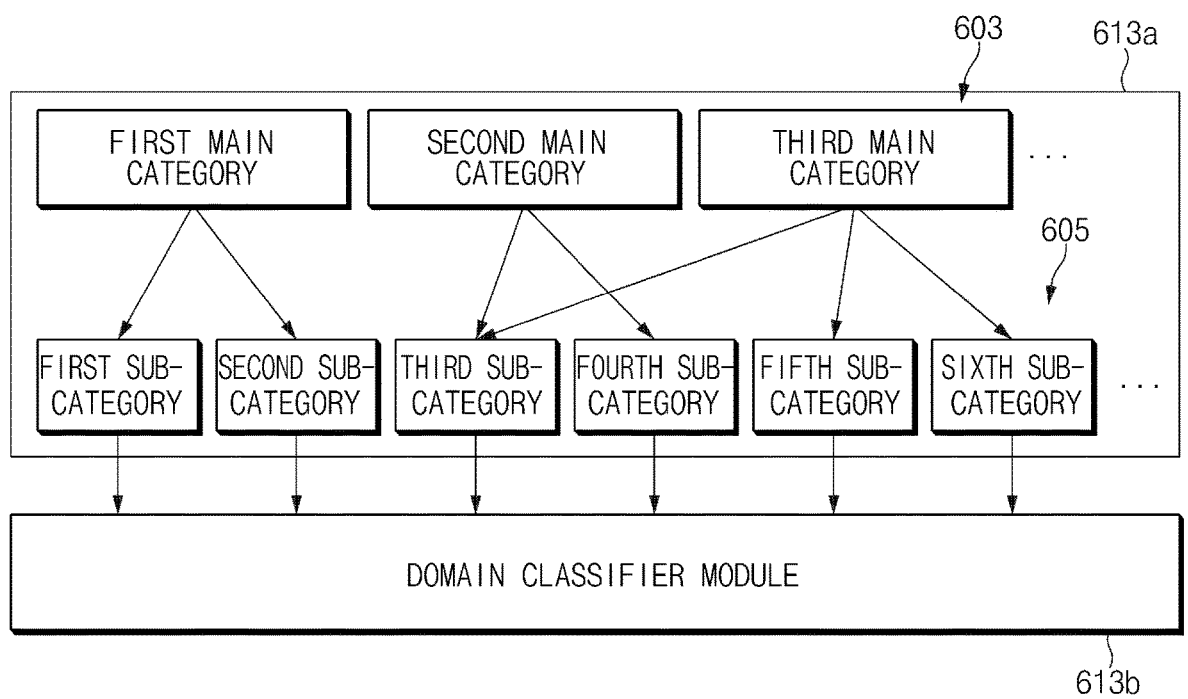
FIG. 10 is a diagram illustrating a configuration of a domain classifier module, according to an embodiment.
Figure 11:
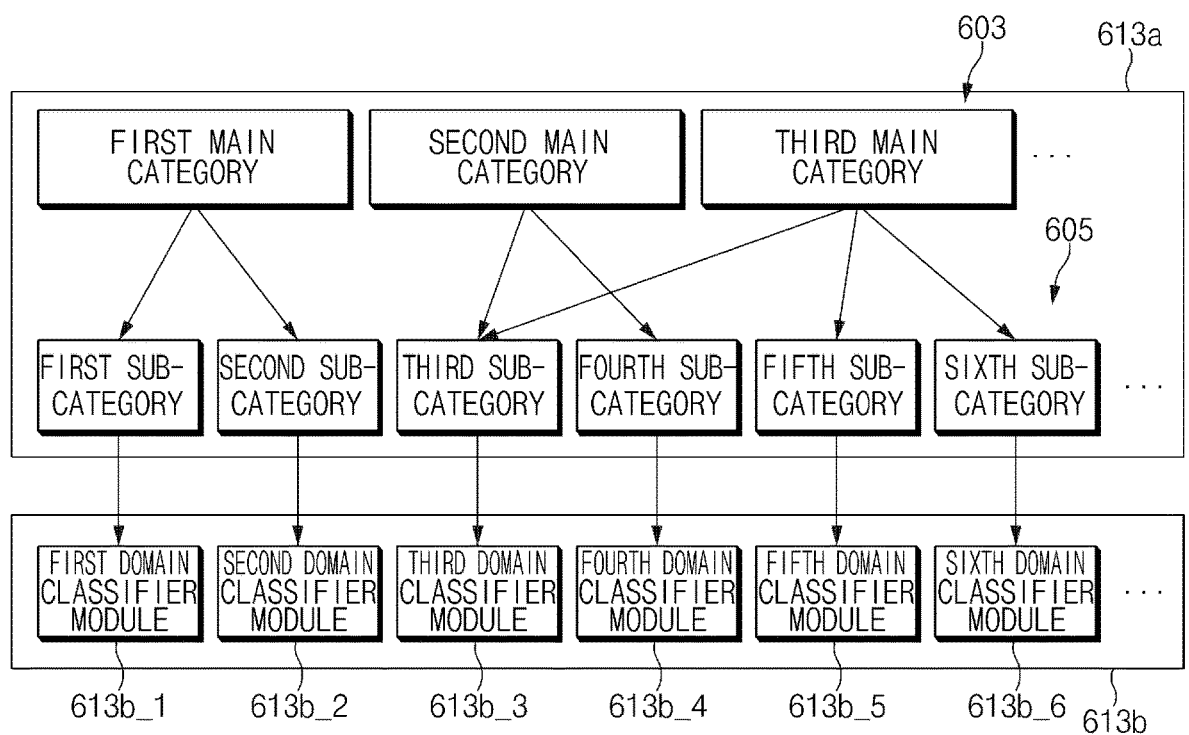
FIG. 11 is a diagram illustrating a configuration of a domain classifier module, according to an embodiment.

FIGS. 10 and 11 are diagrams illustrating a configuration of a domain classifier module, according to an embodiment.

Referring to FIG. 10, the intelligent server 610 includes one domain classifier module (or a chatbot selection module) 613b.

The single domain classifier module 613b may select at least one domain for performing a task corresponding to a user input among a plurality of domains included in the plurality of categories 603 and 605. For example, the single domain classifier module 613b may select at least one domain for performing the task among a plurality of domains included in the plurality of sub-categories 605.

The single domain classifier module 613b may select a domain based on the category determined by the category classifier module 613a. For example, the single domain classifier module 613b may select at least one domain for performing the task among domains included in at least one sub-category.

Referring to FIG. 11, the intelligent server 610 includes a plurality of domain classifier modules 613b_1 to 613b_6.

The plurality of domain classifier modules 613b_1 to 613b_6 may determine at least one domain for performing a task corresponding to a user input among domains included in the corresponding plurality of categories 603 and 605. For example, the plurality of domain classifier modules 613b_1 to 613b_6 may select at least one domain for performing the task among domains included in the corresponding plurality of sub-categories 605.

A plurality of domain classifier modules 613b_1 to 613b_6 may determine a domain by using a method of determining a domain trained for each corresponding category. For example, a plurality of domain classifier modules 613b_1 to 613b_6 may select at least one domain for performing the task among domains included in one sub-category by using a domain determining method trained for the respective plurality of sub-categories 605.

Figure 12:
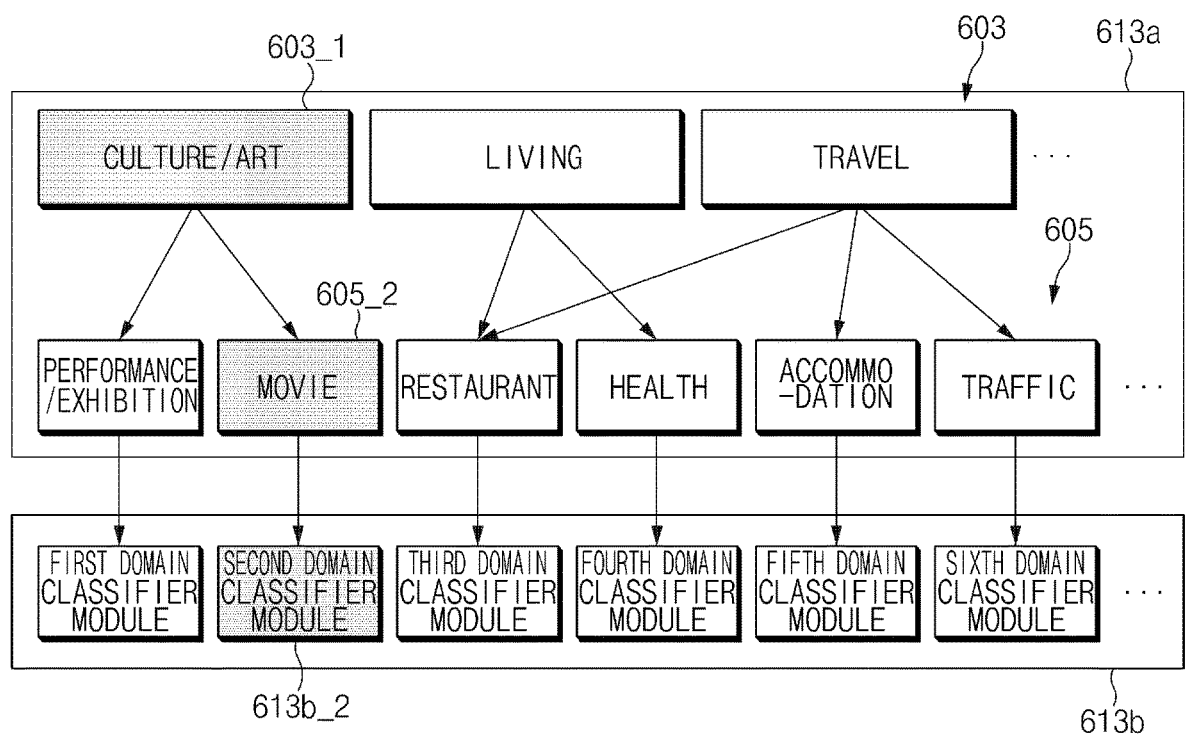
FIG. 12 is a diagram illustrating a case where a category classifier module determines up to a sub-category, according to an embodiment.

FIG. 12 is a diagram illustrating a case where a category classifier module determines up to a sub-category, according to an embodiment.

The category classifier module 613a of the intelligent server 610 may select a culture/art category (or the first main category) 603_1 among a plurality of main categories 603 associated with a received user input.

For example, if the intelligent server 610 receives a user input saying "let me know movie discount information!", the intelligent server 610 may select a movie category 605_2 associated with "movie discount information" corresponding to the user input among a performance/exhibition category 605_1 and the movie category (or the second sub-category) 605_2 included in the selected culture/art category (or the first main category) 603_1.

The intelligent server 610 (e.g., the domain classifier module 613b) may obtain "movie discount information" from a movie-related app corresponding to a domain included in the selected movie category 605_2.

Figure 13:
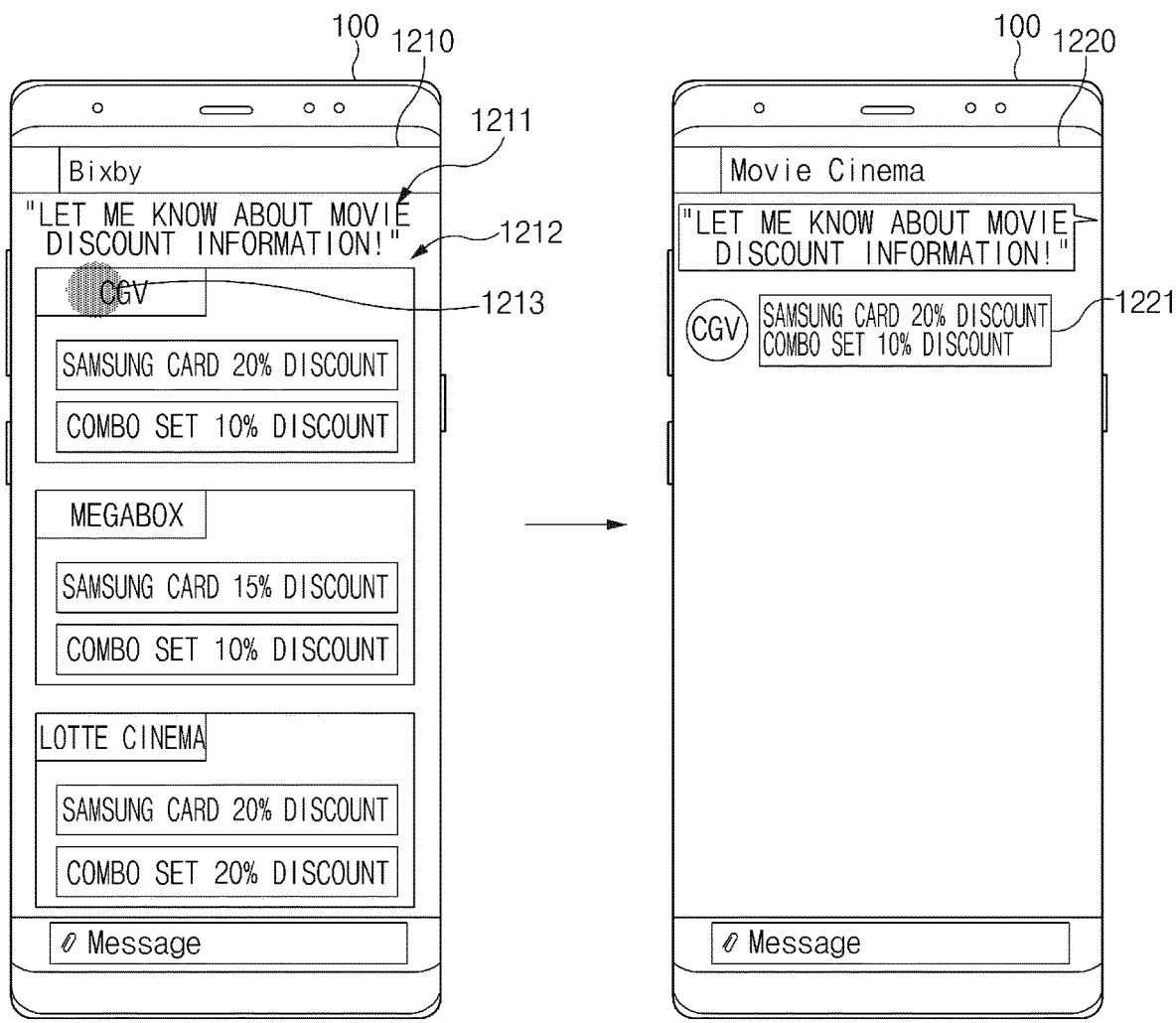
FIG. 13 is a view illustrating a screen of a user terminal when an NLU module determines up to a category of a lower level, according to an embodiment.

FIG. 13 is a view illustrating a screen of a user terminal when an NLU module determines up to a category of a lower level, according to an embodiment.

Referring to FIG. 13, in screen 1210, the user terminal 100 may receive a response corresponding to a first user input 1211 saying "let me know movie discount information!", from the intelligent server 610. For example, the response may include information 1212 obtained through the chatbot server 621, 623, or 625 included in the movie category 605_2 selected by the first user input 1211. As such, the user terminal 100 may provide a user with the result of a user input included in the response in advance. Additionally, the user terminal 100 may receive a second user input (e.g., touch input) 1213 to select some of the information provided to the user (received information).

In screen 1220, the user terminal 100 may receive information 1221 obtained through the domain selected depending on the second user input 1213.

Figure 14:
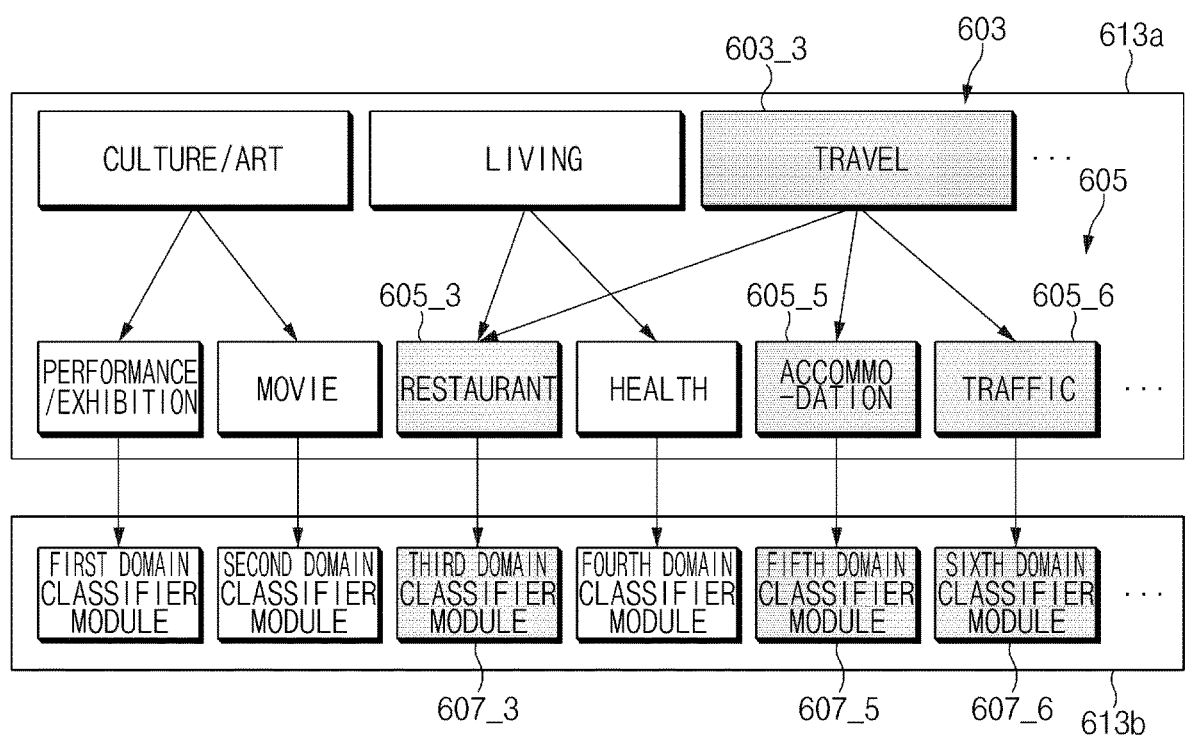
FIG. 14 is a view illustrating a case where an NLU module does not determine up to a category of a lower level, according to an embodiment.

FIG. 14 is a view illustrating a case where an NLU module does not determine up to a category of a lower level, according to an embodiment.

The intelligent server 610 may receive a user input saying that "I want to travel to Busan this weekend!".

The intelligent server 610 (e.g., the category classifier module 613a) may select a travel category (or the third main category) 603_3 among a plurality of main categories 603 associated with the received user input. However, it may be difficult for the intelligent server 610 to determine the most appropriate individual category among a restaurant sub-category (or the third sub-category) 605_3, an accommodation category (or the fifth sub-category) 605_5, and a traffic category (or the sixth sub-category) 605_6 included in the selected travel category 603_3. In one embodiment, a restaurant sub-category (or the third sub-category) 605_3, an accommodation category (or the fifth sub-category) 605_5, and a traffic category (or the sixth sub-category) 605_6 may correspond to a third domain classifier module 607_3, a fifth domain classifier module 607_5, and a sixth domain classifier module 607_6 respectively.

Accordingly, the intelligent server 610 may select a domain included in the travel category 603_3 as being an upper category. For example, the domain included in the travel category 6033 may be a domain included in the restaurant category 6053, the accommodation category 605_5, and the traffic category 605_6. Thus, the intelligent server 610 may obtain "travel information" by using the selected restaurant, accommodation, and traffic-related app.

Figure 15A:
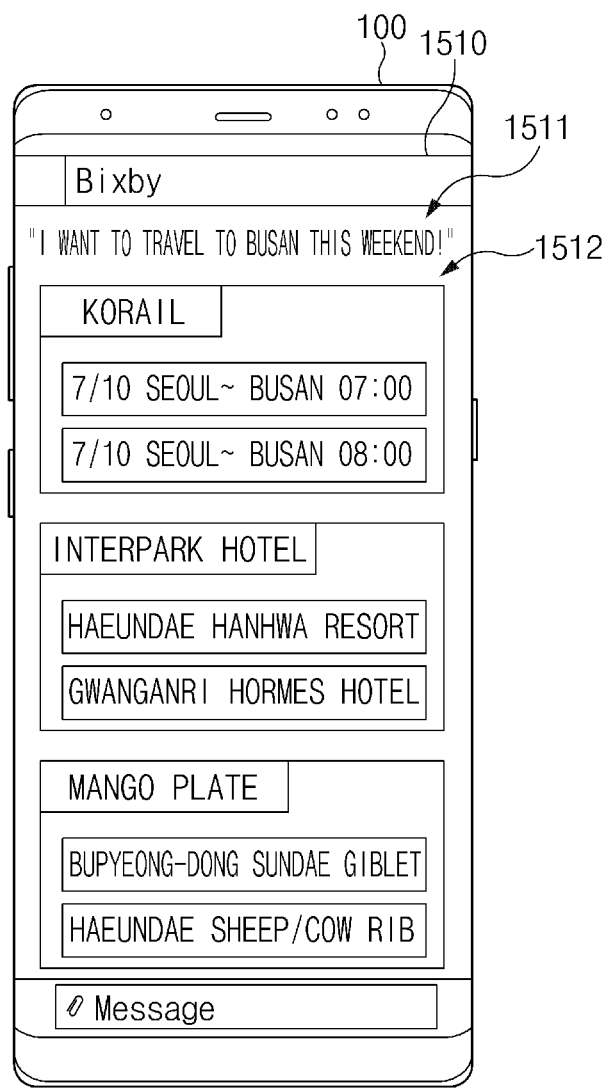
FIG. 15A is a view illustrating a screen of a user terminal when an NLU module does not determine up to a lower category, according to an embodiment.
Figure 15B:
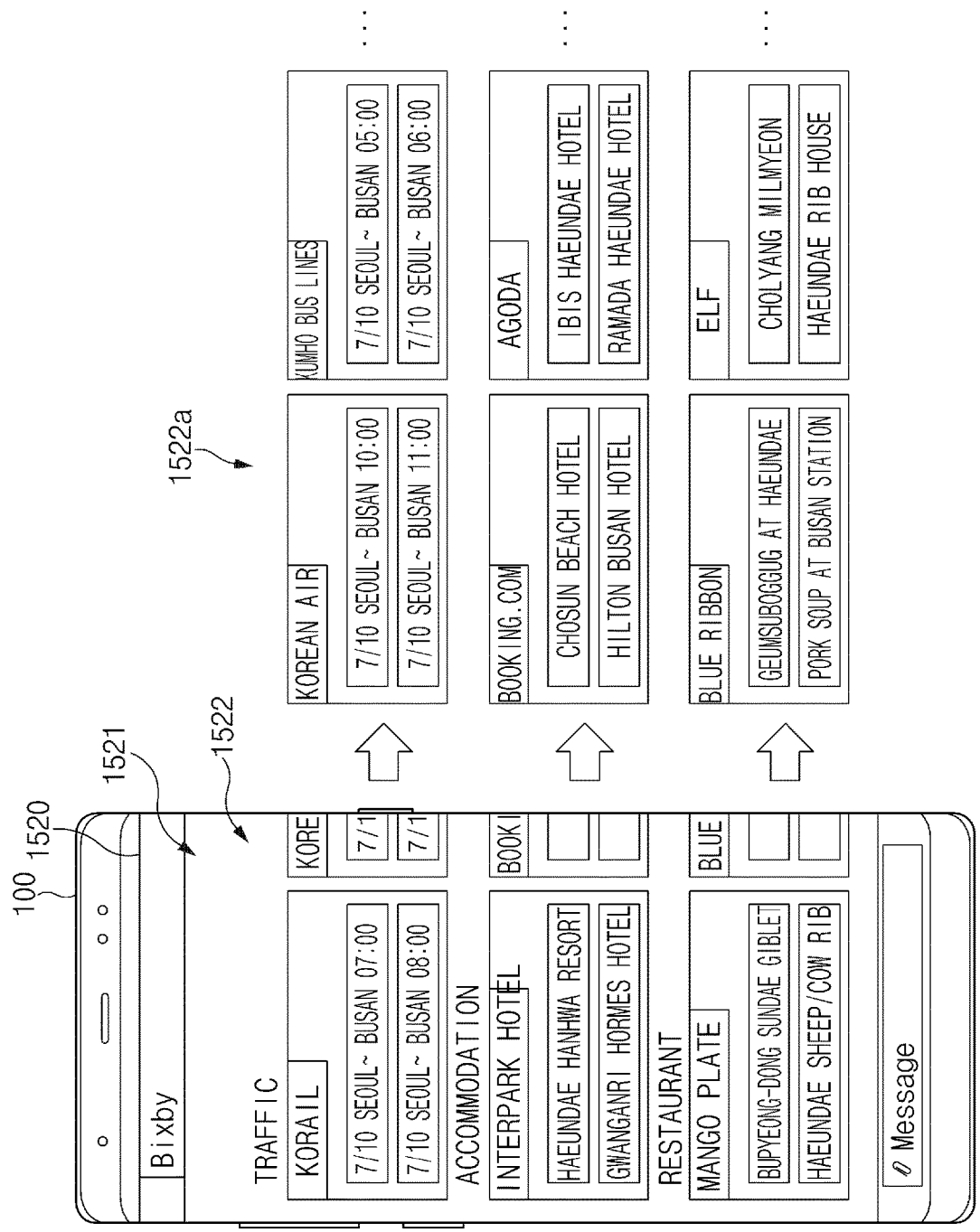
FIG. 15B is a view illustrating a screen of a user terminal when an NLU module does not determine up to a lower category, according to an embodiment.

FIGS. 15A and 15B are views illustrating a screen of a user terminal when an NLU module does not determine up to a lower category, according to an embodiment.

Referring to FIG. 15A, a user terminal may provide a user with a plurality of results respectively corresponding to the selected plurality of categories.

In screen 1510, the user terminal 100 may receive a response corresponding to a first user input 1511 saying "I want to travel to Busan this weekend!" from the intelligent server 610. The user terminal 100 may display the result, which corresponds to each category corresponding to the first user input 1511, on a display. For example, the user terminal 100 may generate a result 1512, which corresponds to a category of each of traffic, accommodation, and a restaurant, through a website or an app and may provide the user with the generated result. The user terminal 100 may display the result 1512 corresponding to each selected category, on the display. The user terminal 100 may provide the user with a service corresponding to a result selected from the result 1512 corresponding to each selected category. For example, the user terminal 100 may execute an app for providing a service corresponding to the selected result (e.g., "Haeundae Hanhwa resort" of Interpark hotel) of the accommodation category and may provide an accommodation reservation service through the executed app.

When the user terminal 100 receives a plurality of results for performing a task corresponding to a user input from the intelligent server 610 (or the chatbot server 621, 623, or 625), the user terminal 100 may selectively display a part of the received plurality of results on the display. For example, the user terminal 100 may preferentially display a result of the plurality of results (i.e., a part of the plurality of results) received from the chatbot server 621, 623, and 625, which the user has utilized or which has a high usage frequency, on the display. Additionally or alternatively, the user terminal 100 may display a result of the plurality of results received from the chatbot server 621, 623, or 625 on the display based on the user's evaluation of the plurality of chatbot servers 620. In other words, the user terminal 100 may preferentially display a result received from the chatbot server 621, 623, or 625, which has received a high evaluation from the user, on the display. The user terminal 100 may receive a feedback input from the user to store the evaluation of the user. Further, the user terminal 100 may display the result received from the chatbot server 621, 623, or 625, on the display using big data. For example, big data may be information collected by the experience(s) of a plurality of users.

Referring to FIG. 15B, the user terminal 100 may provide a user with a plurality of results respectively corresponding to the selected plurality of categories. In other words, the user terminal 100 may bundle the results provided for each category to provide the bundled result to the user.

The user terminal 100 may receive a second user input 1521 saying "I want to travel to Busan this weekend!" from the intelligent server 610. The second user input 1521 may be similar to the first user input 1511 of FIG. 15A. The user terminal 100 may generate a result 1522 corresponding to a plurality of selected categories, such as traffic, accommodation, and a restaurant, through a website or an app, and may provide the user with the generated result. The user terminal 100 may display a plurality of results 1522 corresponding to each selected category, on the display. For example, the plurality of results 1522 may be displayed on respective windows. The windows may provide the user with a result 1522a which is displayed by swiping (e.g., moving in one direction) via the user input. In other words, the plurality of results 1522 may be provided in a card format (i.e., where similar information is organized into boxes) and may be provided to the user. The user input may be a drag input in one direction.

Accordingly, the intelligent server 610 described according to FIGS. 1 to 15B may classify a specified service into at least one category, may select a category, may determine an app (or a domain) for performing a task corresponding to a user input, and may reduce the number of apps, each of which needs to analyze the relation with the user input, thereby effectively processing the user input and providing the user with the execution result of the task in advance through an app in the selected category.

Figure 16:
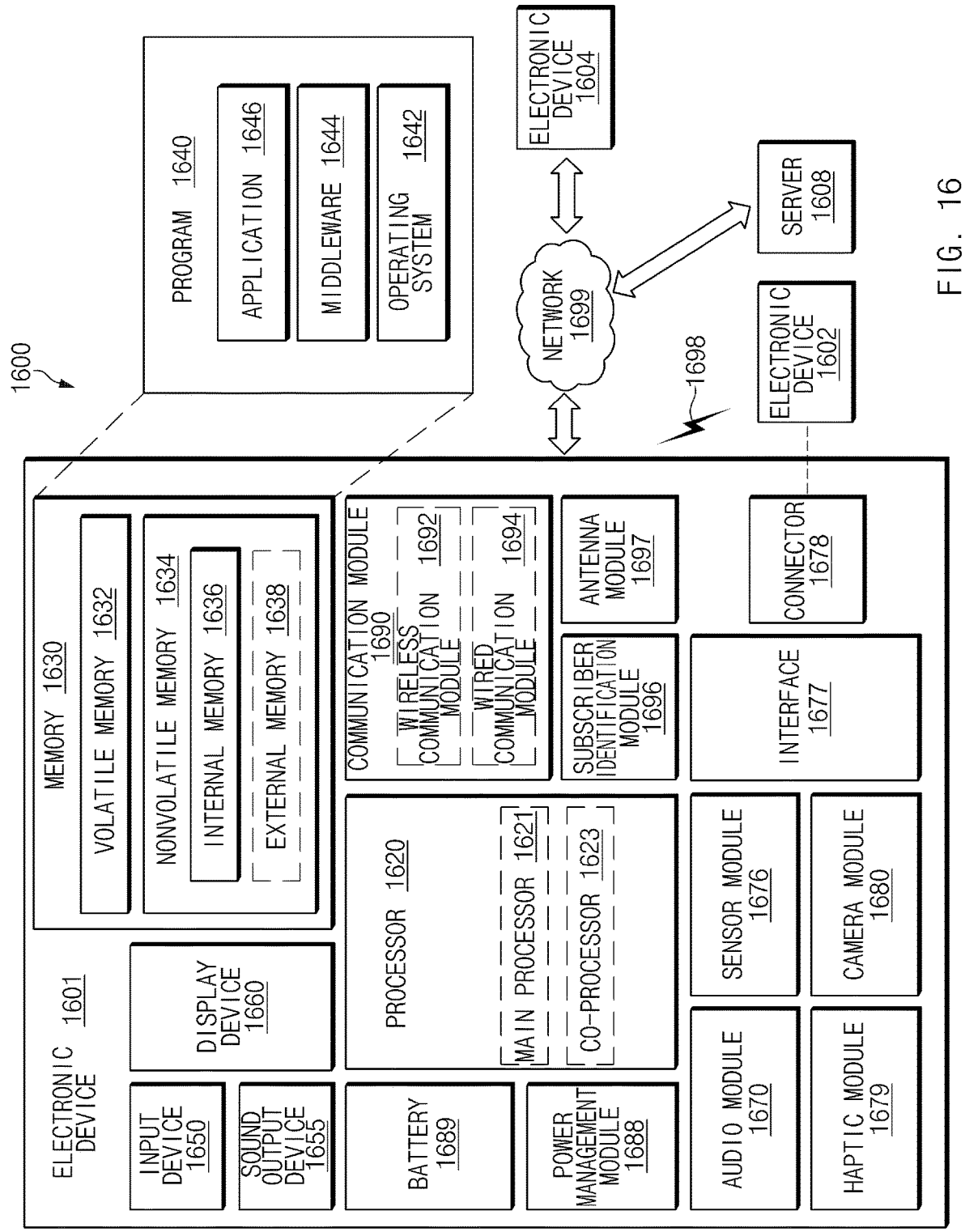
FIG. 16 illustrates a block diagram of an electronic device in a network environment, according to an embodiment.

FIG. 16 illustrates a block diagram of an electronic device 1601 in a network environment 1600 according to various embodiments of the disclosure.

Referring to FIG. 16, the electronic device 1601 may include various types of devices. For example, the electronic device 1601 may include at least one of a portable communication device (e.g., smartphones), a computer device (e.g., a PDA, a tablet personal computers (PCs), a laptop PC, a desktop PC, a workstation, or a server), a portable multimedia device (e.g., an e-book reader or an Motion Picture Experts Group phase 1 or phase 2 (MPEG-1 or MPEG-2) audio layer 3 (MP3) player, a portable medical device (e.g., a heart rate, blood glucose, blood pressure, or a thermometer), a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. According to embodiments, the electronic device may include at least one of, for example, televisions (TVs), digital versatile disc (DVD) players, an audio device, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic device may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or an Internet of things device (e.g., a light bulb, a sprinkler device, a fire alarm, a thermostat, or a street lamp). According to an embodiment of the disclosure, the electronic device is not limited to the above-described devices. For example, similarly to a smartphone having function of measuring personal bio-information (e.g., a heart rate or blood glucose), the electronic device may provide functions of multiple devices in the complex manner. In the disclosure, the term "user" used herein may refer to a person who uses the electronic device or may refer to a device (e.g., an artificial intelligence electronic apparatus) that uses the electronic device.

Referring to FIG. 16, in the network environment 1600, the electronic device 1601 (e.g., the user terminal 100 of FIG. 1) may communicate with an electronic device 1602 through local wireless communication 1698 or may communicate with an electronic device 1604 or a server 1608 (e.g., the intelligent server 200) through a second network 1699. According to an embodiment, the electronic device 1601 may communicate with the electronic device 1604 through the server 1608.

According to an embodiment, the electronic device 1601 may include a bus 1610, a processor 1620 (e.g., the processor 150), a memory 1630, an input device 1650 (e.g., a microphone or a mouse), a display 1660, an audio module 1670, a sensor module 1676, an interface 1677, a haptic module 1679, a camera module 1680, a power management module 1688, a battery 1689, a communication module 1690, and a subscriber ID module 1696. According to an embodiment, the electronic device 1601 may not include at least one (e.g., the display 1660 or the camera module 1680) of the above-described elements or may further include other element(s).

For example, the bus 1610 may interconnect the above-described elements 1620 to 1690 and may include a circuit for conveying signals (e.g., a control message or data) between the above-described elements.

The processor 1620 (e.g., the processor 160) may include one or more of a central processing unit (CPU), an application processor (AP), a GPU, an image signal processor (ISP) of a camera, or a communication processor (CP). According to an embodiment, the processor 1620 may be implemented with a system on chip (SoC) or a system in package (SiP). For example, the processor 1620 may drive an OS or an application to control at least one of another element (e.g., hardware or software element) connected to the processor 1620 and may process and compute various data. The processor 1620 may load an instruction or data, which is received from at least one of other elements (e.g., the communication module 1690), into a volatile memory 1632 to process the instruction or data and may store the process result data into a nonvolatile memory 1634.

The memory 1630 may include, for example, the volatile memory 1632 or the nonvolatile memory 1634. The volatile memory 1632 may include, for example, a random access memory (RAM) (e.g., a dynamic RAM (DRAM), a static RAM (SRAM), or a synchronous DRAM (SDRAM)). The nonvolatile memory 1634 may include, for example, a read-only memory (ROM), a programmable ROM (PROM), an one time PROM (OTPROM), an erasable PROM (EPROM), an electrically EPROM (EEPROM), a mask ROM, a flash ROM, a flash memory, a hard disk drive, or a solid-state drive (SSD). In addition, the nonvolatile memory 1634 may be configured in the form of an internal memory 1636 or the form of an external memory 1638 which is available through connection only if necessary, according to the connection with the electronic device 1601. The external memory 1638 may further include a flash drive such as compact flash (CF), secure digital (SD), micro-SD, mini-SD, extreme digital (xD), a multimedia card (MMC), or a memory stick. The external memory 1638 may be operatively or physically connected with the electronic device 1601 in a wired manner (e.g., a cable or a universal serial bus (USB)) or a wireless (e.g., Bluetooth) manner.

For example, the memory 1630 may store, for example, at least one different software element, such as an instruction or data associated with the program 1640, of the electronic device 1601. The program 1640 may include, for example, a kernel 1641, a library 1643, an application framework 1645 or an application program (interchangeably, "application") 1647.

The input device 1650 may include a microphone, a mouse, or a keyboard. According to an embodiment, the keyboard may include a keyboard physically connected or a keyboard virtually displayed through the display 1660.

The display 1660 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1601.

The audio module 1670 may convert, for example, from a sound into an electrical signal or from an electrical signal into the sound. According to an embodiment, the audio module 1670 may acquire sound through the input device 1650 (e.g., a microphone) or may output sound through an output device (not illustrated) (e.g., a speaker or a receiver) included in the electronic device 1601, an external electronic device (e.g., the electronic device 1602 (e.g., a wireless speaker or a wireless headphone)) or an electronic device 1606 (e.g., a wired speaker or a wired headphone) connected with the electronic device 1601.

The sensor module 1676 may measure or detect, for example, an internal operating state (e.g., power or temperature) or an external environment state (e.g., an altitude, a humidity, or brightness) of the electronic device 1601 to generate an electrical signal or a data value corresponding to the information of the measured state or the detected state. The sensor module 1676 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an ultraviolet (UV) sensor. The sensor module 1676 may further include a control circuit for controlling at least one or more sensors included therein. According to an embodiment, the electronic device 1601 may control the sensor module 1676 by using the processor 1620 or a processor (e.g., a sensor hub) separate from the processor 1620. In the case that the separate processor (e.g., a sensor hub) is used, while the processor 1620 is in a sleep state, the electronic device 1601 may operate without awakening the processor 1620 to control at least a portion of the operation or the state of the sensor module 1676.

According to an embodiment, the interface 1677 may include a high definition multimedia interface (HDMI), a USB, an optical interface, a recommended standard 232 (RS-232), a D-subminiature (D-sub), a mobile high-definition link (MHL) interface, a SD card/MMC interface, or an audio interface. A connector 1678 may physically connect the electronic device 1601 and the electronic device 1606. According to an embodiment, the connector 1678 may include, for example, an USB connector, an SD card/MMC connector, or an audio connector (e.g., a headphone connector).

The haptic module 1679 may convert an electrical signal into mechanical stimulation (e.g., vibration or motion) or into electrical stimulation. For example, the haptic module 1679 may apply tactile or kinesthetic stimulation to a user. The haptic module 1679 may include, for example, a motor, a piezoelectric element, or an electric stimulator.

The camera module 1680 may capture, for example, a still image and a moving picture. According to an embodiment, the camera module 1680 may include at least one lens (e.g., a wide-angle lens and a telephoto lens, or a front lens and a rear lens), an image sensor, an ISP, or a flash (e.g., a LED or a xenon lamp).

The power management module 1688, which is to manage the power of the electronic device 1601, may constitute at least a portion of a power management integrated circuit (PMIC).

The battery 1689 may include a primary cell, a secondary cell, or a fuel cell and may be recharged by an external power source to supply power at least one element of the electronic device 1601.

The communication module 1690 may establish a communication channel between the electronic device 1601 and an external device (e.g., the first external electronic device 1602, the second external electronic device 1604, or the server 1608). The communication module 1690 may support wired communication or wireless communication through the established communication channel. According to an embodiment, the communication module 1690 may include a wireless communication module 1692 or a wired communication module 1694. The communication module 1690 may communicate with the external device through a local wireless communication 1698 (e.g. a wireless local area network (LAN) such as Bluetooth or Infrared Data Association (IrDA)) or a second network 1699 (e.g., a wireless wide area network (WAN) such as a cellular network).

The wireless communication module 1692 may support, for example, cellular communication, local wireless communication, GNSS communication. The cellular communication may include, for example, long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a GPS, a global navigation satellite system (Glonass), Beidou navigation satellite system (Beidou), a European global satellite-based navigation system (Galileo), or the like. In the disclosure, "GPS" and "GNSS" may be interchangeably used.

According to an embodiment, when the wireless communication module 1692 supports cellar communication, the wireless communication module 1692 may, for example, identify or authenticate the electronic device 1601 within a communication network using the subscriber ID module 1696. According to an embodiment, the wireless communication module 1692 may include a CP separate from the processor 1620 (e.g., an AP). In this case, the CP may perform at least a portion of functions associated with at least one of elements 1610 to 1696 of the electronic device 1601 in substitute for the processor 1620 when the processor 1620 is in an inactive (sleep) state, and together with the processor 1620 when the processor 1620 is in an active state. According to an embodiment, the wireless communication module 1692 may include a plurality of communication modules, each supporting only a relevant communication scheme among cellular communication, short-range wireless communication, or a GNSS communication scheme.

The wired communication module 1694 may include, for example, include a LAN service, a power line communication, or a plain old telephone service (POTS).

For example, the local wireless communication 1698 may employ, for example, Wi-Fi direct or Bluetooth for transmitting or receiving instructions or data through wireless direct connection between the electronic device 1601 and the first external electronic device 1602. The second network 1699 may include a telecommunication network (e.g., a computer network such as a LAN or a WAN, the Internet or a telephone network) for transmitting or receiving instructions or data between the electronic device 1601 and the second electronic device 1604.

According to various embodiments, the instructions or the data may be transmitted or received between the electronic device 1601 and the second external electronic device 1604 through the server 1608 connected with the second network. Each of the external first and second external electronic devices 1602 and 1604 may be a device of which the type is different from or the same as that of the electronic device 1601. According to various embodiments, all or a part of operations that the electronic device 1601 will perform may be executed by another or a plurality of electronic apparatuses (e.g., the electronic devices 1602 and 1604 or the server 1608). According to an embodiment, in the case that the electronic device 1601 executes any function or service automatically or in response to a request, the electronic device 1601 may not perform the function or the service internally, but may alternatively or additionally transmit requests for at least a part of a function associated with the electronic device 1601 to another device (e.g., the electronic apparatus 1602 or 1604 or the server 1608). The other electronic apparatus (e.g., the electronic apparatus 1602 or 1604 or the server 1608) may execute the requested function or additional function and may transmit the execution result to the electronic device 1601. The electronic device 1601 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first", or "second" and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to". The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a CPU or an AP) which performs corresponding operations by executing one or more software programs which are stored in a memory device (e.g., the memory 1630).

The term "module" used in this specification may include a unit implemented with hardware, software, or firmware. For example, the term "module" may be interchangeably used with the term "logic", "logic block", "component", "circuit", and the like. The "module" may be an integrated component, a minimum unit for performing one or more functions, or a part thereof. The "module" may be implemented mechanically or electronically. For example, the module may include a well-known or to-be-developed application-specific integrated circuit (ASIC) chip, field-programmable gate arrays (FPGAs), or programmable logic device that perform any operations.

According to various embodiments, at least a part of an apparatus (e.g., modules or functions thereof) or a method (e.g., operations) may be, for example, implemented by instructions stored in a computer-readable storage media (e.g., the memory 1630) in the form of a program module. The instruction, when executed by a processor (e.g., a processor 1620), may cause the processor to perform a function corresponding to the instruction. The computer-readable recording medium may include a hard disk, a floppy disk, a magnetic media (e.g., a magnetic tape), an optical media (e.g., a compact disc-ROM (CD-ROM) and a DVD, a magneto-optical media (e.g., a floptical disk)), an embedded memory, and the like. The instruction may include codes created by a compiler or codes that are capable of being executed by a computer by using an interpreter.

Each element (e.g., a module or a program module) according to various embodiments may be composed of single entity or a plurality of entities, and a part of the above-described sub-elements may be omitted or may further include other elements. Alternatively or additionally, after being integrated in one entity, some elements (e.g., a module or a program module) may identically or similarly perform the function executed by each corresponding element before integration. Operations executed by modules, program modules, or other elements may be executed by a successive method, a parallel method, a repeated method, or a heuristic method. Alternatively, at least some of the operations may be executed in another order or may be omitted, or any other operation may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A system comprising:
   a communication interface;
   at least one processor operatively connected to the communication interface; and
   at least one memory operatively connected to the at least one processor, wherein the at least one memory stores information about a plurality of chatbots configured to provide a task corresponding to a user input, a plurality of categories related to the task, and a plurality of domains corresponding to each of the plurality of categories and provided by each of the plurality of chatbots,
   wherein the plurality of chatbots operate independently of each other and provide a service corresponding to a user input through an interaction with a user, the service provided through each of the plurality of chatbots being different than each other, and the interaction corresponding to a plurality of domains for providing the service, a user's intent, and a parameter for performing the service according to the intent,
   wherein the memory further stores instructions that, when executed, cause the processor to:
   receive, via the communication interface from a client device of the user, data associated with the user input associated with or indicative of a request to perform the task;
   determine whether the user input is sufficient to select, from among the plurality of categories, one or more main categories and one or more sub-categories for performing the at least one task, the plurality of categories being hierarchical, composed of a plurality of levels, and including at least one main category and at least one sub-category, wherein a level of a category from among the plurality of categories is determined depending on a speed at which the user input is processed, wherein the at least one main category is an upper level category and includes the at least one sub-category, and wherein the at least one sub-category is a lower level category compared to the at least one main category;
   when the information included in the user input is not sufficient to determine the at least one sub-category or when there is a conflict between the at least one sub-category and the at least one main category:
   select only the at least one main category,
   select, among the plurality of chatbots, a group of chatbots related to an intent of the user input,
   send, to the client device, a plurality of results for performing the at least one task corresponding to the user input, and
   by using the group of chatbots, display, on a display of the client device, a group of categories and a group of domains corresponding to each of the group of categories as a result related to the task; and
   when the user input is sufficient to select at least one main category and at least one sub-category, based on information included in the user input:
   sequentially select the at least one main category and the at least one sub-category as the at least one category corresponding to the user input,
   select, among the plurality of chatbots, a chatbot related to the at least one sub-category, and
   by using the chatbot, display, on the display of the client device, the at least one sub-category and a domain corresponding to the at least one sub-category as a service corresponding to the task.

2. The system of claim 1, wherein the display displays a graphic user interface that includes at least one section for the at least one category.

3. The system of claim 1, wherein the instructions cause the processor to:
   select the at least one chatbot, based at least partly on at least one of a previous usage of the plurality of chatbots, a usage frequency of the plurality of chatbots, a user preference, and processing speeds of the plurality of chatbots.

4. The system of claim 1, wherein the instructions cause the processor to:
   perform at least part of the task using the selected at least one chatbot, and
   transmit partial result from performing the at least part of the task via the communication interface to the client device such that the client device displays the partial result through the display.

5. The system of claim 1, wherein the instructions cause the processor to:
   select at least one category of the plurality of categories based on the user input; and
   select the at least one chatbot to correspond to the selected category based on the user input.

6. The system of claim 5, wherein the instructions cause the processor to:
   when a time required to select the category is not less than a specified time, select the at least one chatbot based on the user input.

7. The system of claim 1, wherein the plurality of categories includes a plurality of main categories, and at least one sub-category corresponding to each of the plurality of main categories.

8. The system of claim 7, wherein the instructions cause the processor to:
   select at least one of the plurality of main categories based on the user input; and
   select the at least one chatbot to correspond to a sub-category corresponding to the selected at least one main category, based on the user input.

9. A method for processing a user input, the method comprising:
   storing, in at least one memory of a system, information about a plurality of chatbots configured to provide a task corresponding to the user input, a plurality of categories related to the task, and a plurality of domains corresponding to each of the plurality of categories and provided by each of the plurality of chatbots;
   receiving, from a client device of the user, data associated with the user input associated with or indicative of a request to perform the task;

determining whether the user input is sufficient to select, from among a plurality of categories, one or more main categories and one or more sub-categories for performing the at least one task, the plurality of categories being hierarchical, composed of a plurality of levels, and including at least one main category and at least one sub-category, wherein a level of a category from among the plurality of categories is determined depending on a speed at which the user input is processed, wherein the at least one main category is an upper level category and includes the at least one sub-category, and wherein the at least one sub-category is a lower level category compared to the at least one main category;

when the information included in the user input is not sufficient to determine the at least one sub-category or when there is a conflict between the at least one sub-category and the at least one main category:
  selecting only the at least one main category,
  selecting, among the plurality of chatbots, a group of chatbots related to an intent of the user input,
  sending, to the client device, a plurality of results for performing the at least one task corresponding to the user input, and
  by using the group of chatbots displaying, on a display of the client device, a group of categories and a group of domains corresponding to each of the group of categories as a result related to the task; and when the user input is sufficient to select at least one main category and at least one sub-category, based on information included in the user input:
  sequentially selecting the at least one main category and the at least one sub-category as the at least one category corresponding to the user input,
  selecting, among the plurality of chatbots, a chatbot related to the at least one sub-category, and
  by using the chatbot, displaying, on the display of the client device, the at least one sub-category and a domain corresponding to the at least one sub-category as a service corresponding to the task,
wherein the plurality of chatbots operate independently of each other and provide a service corresponding to the user input through an interaction with the user, the service provided through each of the plurality of chatbots being different than each other, and the interaction corresponding to a plurality of domains for providing the service, a user's intent, and a parameter for performing the service according to the intent.

10. The method of claim 9, wherein the display displays a graphic user interface that includes at least one section for the at least one category.

11. The method of claim 9, wherein selecting the at least one chatbot from the plurality of chatbots includes:
  selecting the at least one chatbot, based at least partly on at least one of a previous usage of the chatbot, a user preference, and a processing speed of the chatbot.

12. The method of claim 9, further comprising:
  performing at least part of the task using the selected at least one chatbot, and
  transmitting a partial result from performing the at least part of the task to the client device such that the client device displays the partial result through the display.

13. The method of claim 9, wherein selecting the at least one chatbot includes:
  selecting at least one category of the plurality of categories based on the user input; and
  selecting the at least one chatbot of a chatbot corresponding to the selected category based on the user input.

14. The method of claim 13, further comprising:
  when a time required to select the category is not less than a specified time, selecting the at least one chatbot based on the user input.

15. The method of claim 9, wherein the plurality of categories includes a plurality of main categories, and at least one sub-category corresponding to each of the plurality of main categories.

16. The method of claim 15, wherein selecting the at least one chatbot includes:
  selecting at least one of the plurality of main categories based on the user input; and
  selecting the at least one chatbot to correspond to a sub-category corresponding to the selected at least one main category, based on the user input.

* * * * *